US009970378B2

(12) United States Patent
Ochi

(10) Patent No.: US 9,970,378 B2
(45) Date of Patent: May 15, 2018

(54) INTERNAL COMBUSTION ENGINE

(71) Applicant: TOYOTA JIDOSHA KABUSHIKI KAISHA, Toyota-shi, Aichi-ken (JP)

(72) Inventor: Yuta Ochi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/412,591

(22) Filed: Jan. 23, 2017

(65) Prior Publication Data
US 2017/0211499 A1    Jul. 27, 2017

(30) Foreign Application Priority Data

Jan. 25, 2016   (JP) ................................ 2016-011443

(51) Int. Cl.
*F02D 41/30*     (2006.01)
*F02D 13/02*     (2006.01)
(Continued)

(52) U.S. Cl.
CPC ........ *F02D 41/3023* (2013.01); *F02B 23/101* (2013.01); *F02B 29/0493* (2013.01);
(Continued)

(58) Field of Classification Search
CPC ...... F02D 13/02; F02D 13/0215; F02D 41/30; F02D 41/3023; F02D 41/3035;
(Continued)

(56) References Cited

U.S. PATENT DOCUMENTS

| | | | | |
|---|---|---|---|---|
| 5,915,351 A | * | 6/1999 | Regueiro | ............... F02B 19/16 123/254 |
| 2005/0072399 A1 | * | 4/2005 | Kojic | ....................... F02B 5/00 123/254 |

(Continued)

FOREIGN PATENT DOCUMENTS

JP         2011-153562 A     8/2011

*Primary Examiner* — John Kwon
*Assistant Examiner* — Johnny H Hoang
(74) *Attorney, Agent, or Firm* — Hunton Andrews Kurth LLP

(57) ABSTRACT

An internal combustion engine comprising the fuel injector arranged in the combustion chamber. The primary fuel injection and the secondary fuel injection from the fuel injector are successively performed to cause autoignition of an injected fuel of the primary fuel injection and autoignition of an injected fuel of the secondary fuel injection. A temperature region suppressing change of an ignition delay time where a change of ignition delay time with respect to a rise in temperature in the combustion chamber is suppressed appears in the compression stroke at a temperature in the combustion chamber of 700K to 900K. The secondary fuel injection is performed if the temperature in the combustion chamber is a temperature within the temperature region suppressing change of the ignition delay time during the compression stroke. The primary fuel injection is performed during the compression stroke or suction stroke before the temperature in the combustion chamber reaches a temperature in the temperature region suppressing change of the ignition delay time at a fuel injection timing at which the injected fuel of the secondary fuel injection is autoignited after the injected fuel of the primary fuel injection is autoignited.

7 Claims, 16 Drawing Sheets

(51) Int. Cl.
*F02B 23/10* (2006.01)
*F02B 29/04* (2006.01)
*F02D 41/24* (2006.01)
*F02D 41/40* (2006.01)
*F02D 35/02* (2006.01)
*F02M 26/05* (2016.01)

(52) U.S. Cl.
CPC ..... *F02D 13/0215* (2013.01); *F02D 41/3035* (2013.01); *F02D 41/402* (2013.01); *F02D 35/025* (2013.01); *F02D 41/2409* (2013.01); *F02D 41/3041* (2013.01); *F02D 41/401* (2013.01); *F02D 2200/021* (2013.01); *F02D 2200/0414* (2013.01); *F02D 2200/1002* (2013.01); *F02M 26/05* (2016.02); *Y02T 10/125* (2013.01); *Y02T 10/146* (2013.01); *Y02T 10/18* (2013.01); *Y02T 10/44* (2013.01)

(58) Field of Classification Search
CPC ....... F02D 2200/021; F02D 2200/0414; F02D 2200/1002; F02B 23/101; F02B 29/04; F02B 29/0493; Y02T 10/18; Y02T 10/44
USPC ......... 701/102–105; 123/295–299, 301, 305, 123/406.3, 406.32, 406.47, 406.55
See application file for complete search history.

(56) References Cited

U.S. PATENT DOCUMENTS

| 2007/0169748 | A1* | 7/2007 | Nakayama | F02D 35/02 123/435 |
| 2016/0069291 | A1* | 3/2016 | Ge | F02D 41/3035 701/103 |
| 2016/0084204 | A1* | 3/2016 | Ge | F02D 41/0065 123/568.12 |
| 2017/0138314 | A1* | 5/2017 | Fujimoto | F02D 41/0025 |

* cited by examiner

INTERNAL COMBUSTION ENGINE

CROSS-REFERENCE TO RELATED APPLICATION

The present application claims priority to Japanese Patent Application No. 2016-011443 filed on Jan. 25, 2016, which is incorporated herein by reference in its entirety.

TECHNICAL FIELD

Embodiments of the present invention relate to an internal combustion engine.

BACKGROUND ART

In an internal combustion engine, the higher the compression ratio, the more the thermal efficiency is improved, while the thinner the air-fuel ratio of the air-fuel mixture, the more the fuel consumption is improved. In a conventional spark ignition combustion internal combustion engine which uses a spark plug to ignite part of the air-fuel mixture and uses propagation of the ignited flame to burn the remaining air-fuel mixture, the compression ratio cannot be raised because knocking would occur. Further, the air-fuel ratio of the air-fuel mixture cannot be made thinner because the ignited flame can no longer propagate. As opposed to this, autoignition combustion is possible even if raising the compression ratio. Further, autoignition combustion is possible even if making the air-fuel ratio of the air-fuel mixture thinner. Therefore, if performing autoignition combustion, it is possible to improve the thermal efficiency and possible to improve the fuel consumption.

Further, in this autoignition combustion, the fuel diffused in a combustion chamber is made to burn in the combustion chamber at many points simultaneously. If the diffused fuel is made to burn simultaneously at many points in this way, the combustion temperature becomes lower over the entire area in the combustion chamber, so the production of $NO_x$ is suppressed and, furthermore, sufficient oxygen is present around the fuel, so the production of unburned HC is also suppressed. In this way, autoignition combustion has numerous advantages, so has been drawing attention since the past. Numerous internal combustion engines designed to perform autoignition combustion are known (for example, see Japanese Patent Publication No. 2011-153562A).

SUMMARY

Technical Problem

In this way, autoignition combustion has numerous advantages, but, as explained above, in autoignition combustion, fuel diffused in a combustion chamber is made to burn in the combustion chamber simultaneously at many points, so if the amount of fuel fed to the combustion chamber becomes greater, the combustion pressure would rapidly increase and as a result the problem of combustion noise would arise.

Solution to Problem

To solve the above problem, according to embodiments of the present invention, there is provided an internal combustion engine comprising a fuel injector arranged in a combustion chamber and injecting fuel comprised of gasoline and an electronic control unit controlling a fuel injection action from the fuel injector, primary fuel injection and secondary fuel injection from the fuel injector being successively performed to cause autoignition of an injected fuel of the primary fuel injection and autoignition of an injected fuel of the secondary fuel injection, and a temperature region suppressing change of an ignition delay time where a change of ignition delay time with respect to a rise in temperature in a combustion chamber is suppressed appearing in a compression stroke at a temperature in the combustion chamber of 700K to 900K, wherein the electronic control unit is configured to make the fuel injector perform the secondary fuel injection if a temperature in the combustion chamber is a temperature within the temperature region suppressing change of the ignition delay time during the compression stroke, and the electronic control unit is configured to make the fuel injector perform the primary fuel injection during the compression stroke or suction stroke before the temperature in the combustion chamber reaches a temperature in the temperature region suppressing change of the ignition delay time at a fuel injection timing at which the injected fuel of the secondary fuel injection is autoignited after the injected fuel of the primary fuel injection is autoignited.

Advantageous Effects of Embodiments of the Invention

It is possible to reduce the combustion noise during autoignition combustion by causing the injected fuel of the secondary fuel injection to be autoignited after the injected fuel of the primary fuel injection is autoignited.

BRIEF DESCRIPTION OF DRAWINGS

FIG. 18A and FIG. 18B are views showing a map of injection timing W1 of primary fuel injection G and a map of injection timing W2 of secondary fuel injection G, respectively.

DESCRIPTION OF EMBODIMENTS

Figure 1:
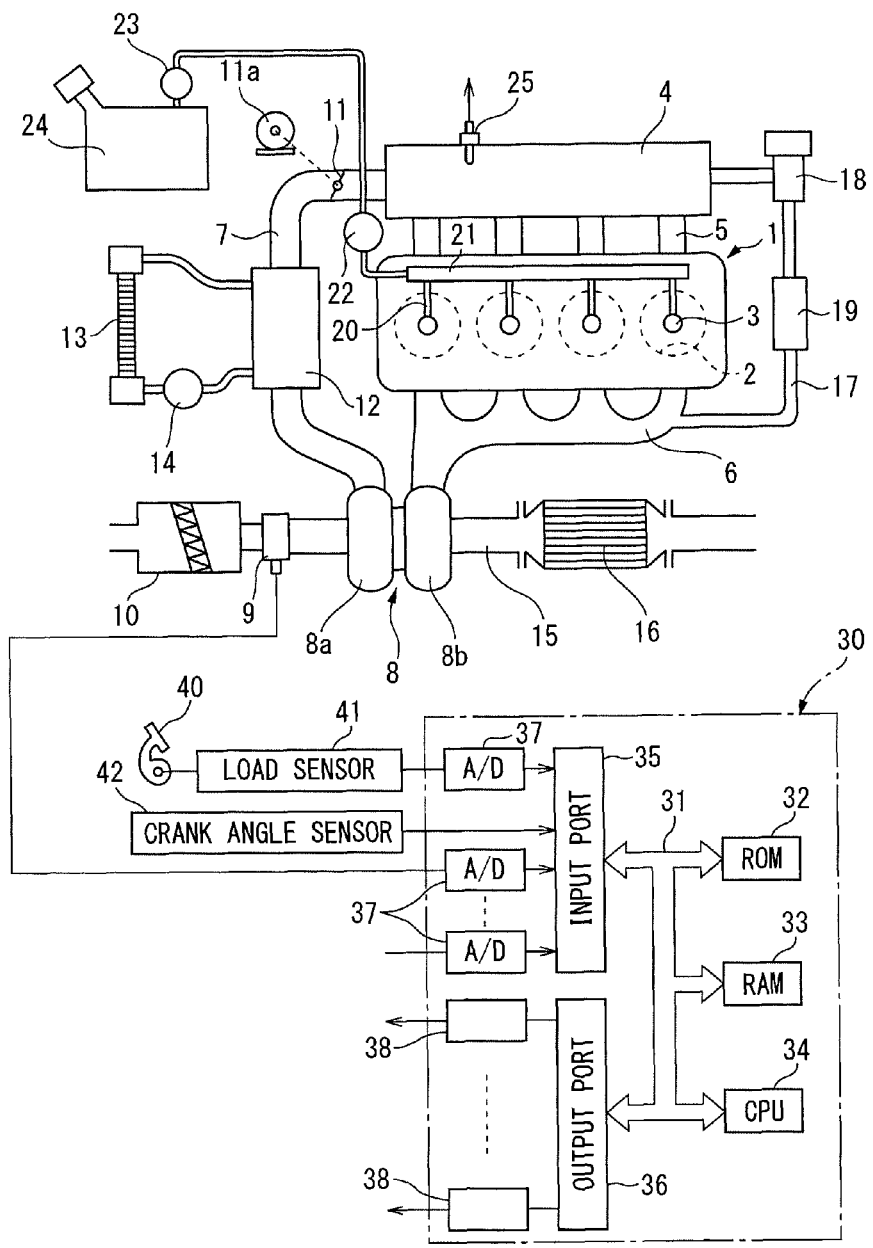
FIG. 1 is an overall view of an internal combustion engine using gasoline as a fuel.

FIG. 1 is an overall view of an internal combustion engine using gasoline as fuel. Referring to FIG. 1, 1 indicates an engine body, 2 a combustion chamber of each cylinder, 3 an electronic control type fuel injector for injecting fuel comprised of gasoline to each combustion chamber 2, 4 a surge tank, 5 an intake branch pipe, and 6 an exhaust manifold. The surge tank 4 is connected through an intake duct 7 to the outlet of a compressor 8a of an exhaust turbocharger 8, while the inlet of the compressor 8a is connected through an intake air amount detector 9 to an air cleaner 10. Inside this intake duct 7, a throttle valve 11 driven by an actuator 11a is arranged. Around the intake duct 7, an intercooler 12 for cooling the intake air flowing through the intake duct 7 is arranged. As shown in FIG. 1, this intercooler 12 is provided with an intercooler radiator 13 and an electrically driven cooling water pump 14 for making the cooling water cooled at the radiator 13 circulate through the intercooler 12.

The exhaust manifold 6 is connected to the inlet of an exhaust turbine 8b of the exhaust turbocharger 8, while the outlet of the exhaust turbine 8b is connected through an exhaust pipe 15 to an exhaust purification use catalytic converter 16. The exhaust manifold 5 and the surge tank 4 are connected with each other through an exhaust gas recirculation (below, called "EGR") passage 17. Inside the EGR passage 17, an electronic control type EGR control valve 18 is arranged. Around the EGR passage 17, an EGR cooler 19 for cooling the EGR gas flowing through the EGR passage 17 is arranged. In the embodiment shown in FIG. 1, the engine cooling water is guided to the EGR cooler 19 where the engine cooling water is used to cool the EGR gas. Further, each fuel injector 3 is connected through a fuel feed tube 20 to a fuel distribution tube 21. This fuel distribution tube 21 is coupled through a high pressure fuel pump 22 and low pressure fuel pump 23 to a fuel tank 24. Note that, the internal combustion engine shown in FIG. 1 has a high compression ratio of 14 or more.

Intake air is fed through the intake air amount detector 9, compressor 8a, intercooler 12, and intake duct 7 to the inside of the surge tank 4, then intake air fed to the inside of the surge tank 4 is fed through the intake branch pipe 5 to each combustion chamber 2. Further, EGR gas is fed through the EGR passage 17 to the inside of the surge tank 4, and this EGR gas is also fed together with the intake air through the intake branch pipe 5 to the inside of each combustion chamber 2. The fuel stored in the fuel tank 24, that is, the gasoline, is fed by the low pressure fuel pump 23 and high pressure fuel pump 22 to the inside of the fuel distribution tube 21, and the fuel fed to the inside of the fuel distribution tube 21 is injected through each fuel feed tube 20 from the fuel injector 3 to each combustion chamber 2. The exhaust gas discharged from each combustion chamber 2 is discharged through the exhaust manifold 6, exhaust turbine 8b, exhaust pipe 15, and exhaust purification-use catalytic converter 16 to the outside air.

The electronic control unit 30 is comprised of a digital computer provided with a ROM (read only memory) 32, RAM (random access memory) 33, CPU (microprocessor) 34, input port 35, and output port 36, which are interconnected with each other by a bidirectional bus 31. A temperature sensor 25 for detecting the intake air temperature is arranged in the surge tank 4, and the output signals of this temperature sensor 25 and the intake air amount detector 9 are input through the corresponding AD converters 37 to the input port 35. Further, a load sensor 41 generating an output voltage proportional to the amount of depression of the accelerator pedal 40 is connected to an accelerator pedal 40, and the output voltage of the load sensor 41 is input through the corresponding AD converter 37 to the input port 35. Furthermore, a crank angle sensor 42 generating an output pulse every time the crankshaft rotates by for example 30° is connected to the input port 35. The output port 36 is connected to corresponding drive circuits 38 to the fuel injectors 3, throttle valve drive use actuator 11a, cooling water pump 14, EGR control valve 18, high pressure fuel pump 22, and low pressure fuel pump 23.

Figure 2:
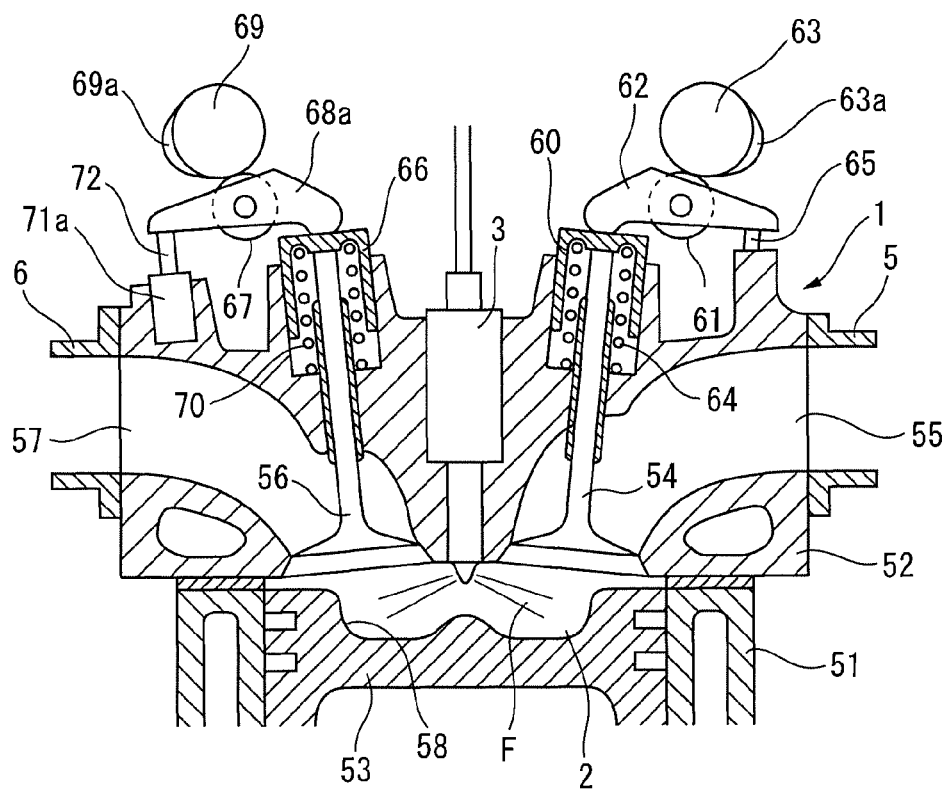
FIG. 2 is a cross-sectional view of an engine body.
Figure 3:
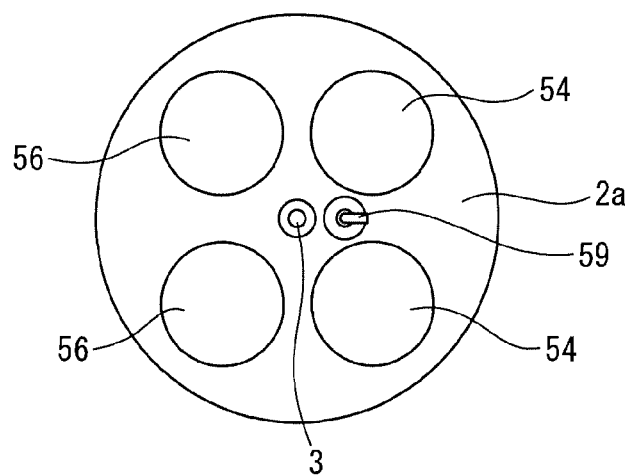
FIG. 3 is a bottom view of a top wall surface of a combustion chamber shown in FIG. 2.

FIG. 2 is a cross-sectional view of the engine body 1 shown in FIG. 1, while FIG. 3 is a bottom view of a top wall surface of the combustion chamber 2 shown in FIG. 2. Note that, in FIG. 2 and FIG. 3, 51 indicates a cylinder block, 52 a cylinder head attached on the cylinder block 51, 53 a piston reciprocally moving in the cylinder block 51, 54 a pair of intake valves, 55 intake ports, 56 a pair of exhaust valves, and 57 exhaust ports. As shown in FIG. 3, the fuel injector 3 is arranged at a center of the top wall surface 2a of the combustion chamber 2, and fuel F is injected from the fuel injector 3 toward the peripheral portion in a cavity 58 formed in the top surface of the piston 53. Further, on the top wall surface 2a of the combustion chamber 2, a spark plug 59 is arranged adjoining the fuel injector 3.

As shown in FIG. 2, for each intake valve 54, a valve lifter 60, a rocker arm 62 provided with a roller 61, and a camshaft 63 for intake valve use are provided. The valve lifter 60 is slidably supported in the cylinder head 52 and seated on the top end part of the intake valve 54. Inside the valve lifter 60, a compression spring 64 biasing the valve lifter 60 toward the upward direction is arranged. One end of the rocker arm 62 is supported by a fixed support member 65, while the other end of the rocker arm 62 is seated on the top wall surface of the valve lifter 60. If the camshaft 63 rotates and a cam 63a formed on the camshaft 63 causes the roller 61 to be pushed downward, the rocker arm 62 turns counterclockwise about the fixed support member 65 whereby the intake valve 54 is opened.

In the same way, for each exhaust valve 56, a valve lifter 66, a rocker arm 68a provided with a roller 67, and a camshaft 69 for exhaust valve use are provided. The valve lifter 66 is slidably supported in the cylinder head 52 and seated on the top end part of the exhaust valve 56. Inside the valve lifter 66, a compression spring 70 biasing the valve lifter 66 toward the upward direction is arranged. One end of the rocker arm 68a is supported by the tip end part of the movable rod 72 of the support position adjustment device 71a, while the other end of the rocker arm 68a is seated on the top wall surface of the valve lifter 66. If the movable rod 72 of the support position adjustment device 71a is held at the projecting position shown in FIG. 2, and if the camshaft 69 rotates and a cam 69a formed on the camshaft 69 causes the roller 67 to be pushed downward, the rocker arm 68a turns clockwise about the tip end part of the movable rod 72 whereby the exhaust valve 56 is opened.

Figure 4:
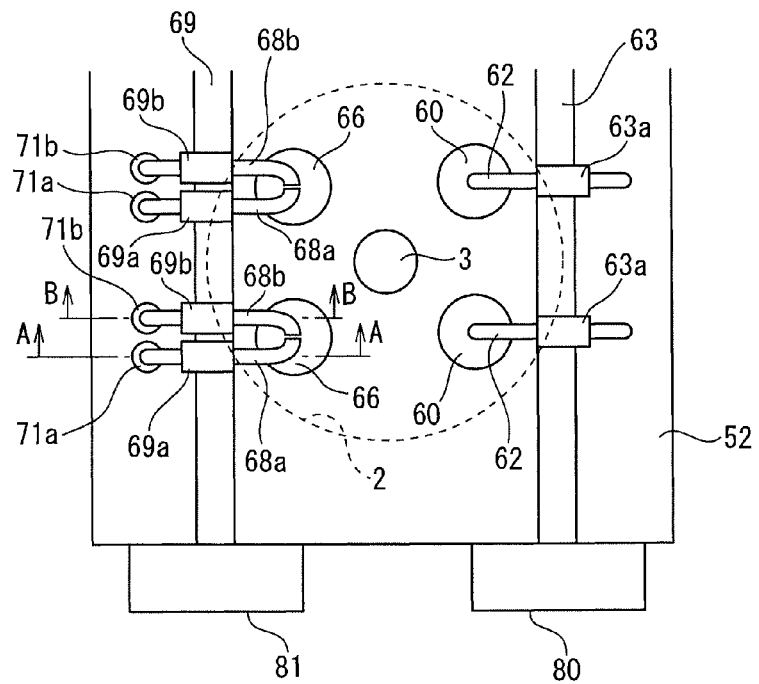
FIG. 4 is a plan view of an end part of a cylinder head in a longitudinal direction.
Figure 5A:
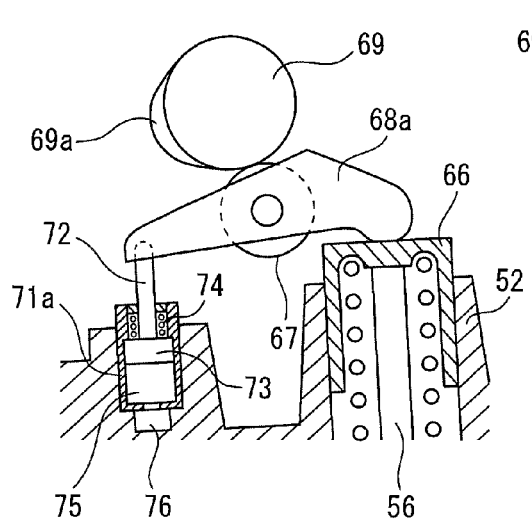
FIG. 5A and FIG. 5B are views showing a cross-section A-A and a cross-section B-B in FIG. 4, respectively.
Figure 5B:
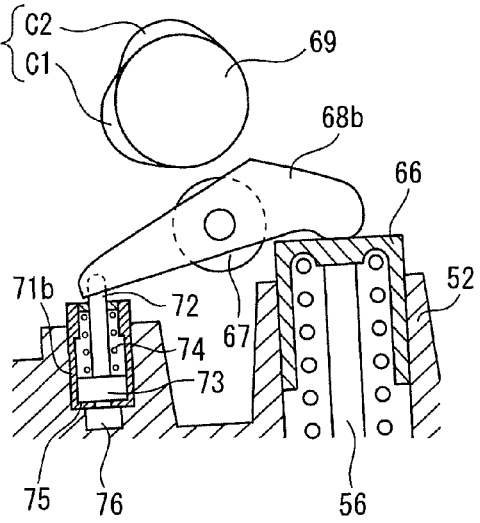

FIG. 4 is a plan view of an end part of the cylinder head 51 in the longitudinal direction. FIG. 5A shows a cross-section A-A at FIG. 4, and FIG. 5B shows a cross-section B-B at FIG. 4. As shown in FIG. 4, the end part of the intake valve-use camshaft 63 is connected to a variable valve timing mechanism 80 enabling change of the opening timing of the intake valve 54, while the end part of the exhaust valve-use camshaft 69 is connected to a variable valve timing mechanism 81 enabling change of the opening timing of the exhaust valve 56. As shown in FIG. 4, one rocker arm 62 and one cam 63a are provided for the valve lifter 60 of each intake valve 54, while a pair of rocker arms 68a, 68b, a pair of cams 69a, 69b, and a pair of support position adjustment devices 71a, 71b are provided for the valve lifter 66 of each exhaust valve 56.

The support position adjustment device 71a and support position adjustment device 71b have the same structures. Next, the structures of these support position adjustment devices 71a and 71b will be explained with reference to FIG. 5A and FIG. 5B. As shown in FIG. 5A and FIG. 5B, the support position adjustment devices 71a and 71b are provided with pistons 73 coupled with the movable rods 72 in the support position adjustment devices 71a and 71b and able to move in the axial directions of the movable rods 72, compression springs 74 biasing the pistons 73 downward, and hydraulic chambers 75 defined by the pistons 73. Hydraulic fluid is fed to the hydraulic chambers 75 through hydraulic passages 76 formed in the cylinder head 52.

FIG. 5A shows a time when hydraulic fluid is fed into the hydraulic chamber 75 of the support position adjustment device 71a, while FIG. 5B shows a time when hydraulic fluid is discharged from hydraulic chamber 75 of the support position adjustment device 71b. As shown in FIG. 5A, if hydraulic fluid is fed into the hydraulic chamber 75 of the support position adjustment device 71a, the piston 73 rises and the movable rod 72 is held at the projecting position. At this time, if the camshaft 69 rotates, the cam 69a formed on the camshaft 69 causes the roller 67 to be pushed downward. Due to this, the exhaust valve 56 is made to open. As shown in FIG. 5B, if the hydraulic fluid in the hydraulic chamber 75 of the support position adjustment device 71b is discharged, the piston 73 descends and the movable rod 72 is held at the retracted position. At this time, even if the camshaft 69 rotates, the cam 69b formed on the camshaft 69 will no longer engage with the roller 67, therefore the cam 69b will not operate to open the exhaust valve 56 at this time.

As shown in FIG. 5A, the cam 69a formed on the camshaft 69 has only one cam lobe. As opposed to this, as shown in FIG. 5B, the cam 69b formed on the camshaft 69 has two cam lobes including a cam C1 and a cam C2 smaller than the cam C1. The cam lobe of the cam 69a shown in FIG. 5A is formed so as to make the exhaust valve 56 open during the exhaust stroke, while the larger cam C1 of the cam 69b shown in FIG. 5B is also formed so as to make the exhaust valve 56 open during the exhaust stroke. As opposed to this, the smaller cam C2 of the cam 69b shown in FIG. 5B is formed so as to make the exhaust valve 56 open during the suction stroke. Therefore, if hydraulic fluid is fed to the hydraulic chamber 75 of the support position adjustment device 71a as shown in FIG. 5A and the hydraulic fluid inside the hydraulic chamber 75 of the support position adjustment device 71b is discharged as shown in FIG. 5B, the exhaust valve 56 is made to open during the exhaust stroke, while if the hydraulic fluid inside the hydraulic chamber 75 of the support position adjustment device 71a is discharged and hydraulic fluid is fed inside the hydraulic chamber 75 of the support position adjustment device 71b, the exhaust valve 56 opens during the exhaust stroke, then reopens in the suction stroke.

In this way, by controlling the feed of hydraulic fluid to the support position adjustment devices 71a, 71b and discharging hydraulic fluid from the support position adjustment devices 71a, 71b, it is possible to switch the opening action of the exhaust valve 56 between a single opening action during the exhaust stroke or a double opening action opening the valve during the exhaust stroke and suction stroke. Note that, the valve drive mechanism shown in FIG. 4, FIG. 5A, and FIG. 5B for switching the opening action of the exhaust valve 56 to either of a single opening action during the exhaust stroke or a double opening action opening respectively during the exhaust stroke and during the suction stroke in this way is only shown as a typical example. Instead of the valve drive mechanism shown in FIG. 4, FIG. 5A, and FIG. 5B, various other valve drive mechanisms able to switch the opening action of the exhaust valve 56 to either of a single opening action during the exhaust stroke or a double opening action opening respectively during the exhaust stroke and during the suction stroke may also be used.

Figure 6:
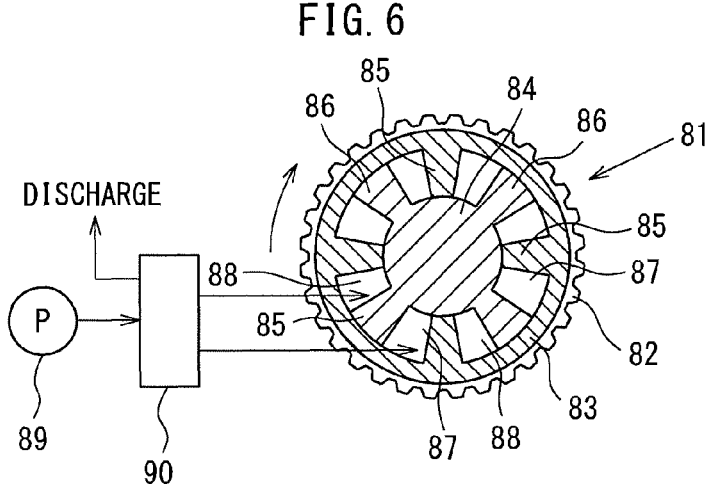
FIG. 6 is a cross-sectional view of a variable valve timing mechanism for an exhaust valve.

FIG. 6 is a cross-sectional view of the variable valve timing mechanism 81 enabling change of the opening timing of the exhaust valve 56. Note that, the variable valve timing mechanism 80 enabling change of the opening timing of the intake valve 54 shown in FIG. 4 also has a structure which is the same as that of the variable valve timing mechanism 81. If referring to FIG. 6, the variable valve timing mechanism 81 is provided with a timing pulley 82 made to rotate in the arrow direction by the engine crankshaft through a timing belt, a cylindrical housing 83 rotating together with the timing pulley 82, a shaft 84 rotating together with the exhaust valve use camshaft 69 and able to rotate relative to the cylindrical housing 83, a plurality of partition walls 85 extending from the inner circumferential surface of the cylindrical housing 83 to the outer circumferential surface of the shaft 84, and vanes 86 extending between the partition walls 85 from the outer circumferential surface of the shaft 84 to the inner circumferential surface of the cylindrical housing 83. At the two sides of each vane 86, an advancing use hydraulic chamber 87 and a retarding use hydraulic chamber 88 are respectively formed.

Control of the feed of hydraulic fluid from the hydraulic fluid feed pump 89 to the hydraulic chambers 87 and 88 and control of the discharge of hydraulic fluid from the hydraulic chambers 87 and 88 are performed by a hydraulic fluid feed/discharge control valve 90. If the phase of the cam of the exhaust valve-use camshaft 69 is advanced, the hydraulic fluid feed/discharge control valve 90 causes the hydraulic fluid to be fed to the advancing-use hydraulic chamber 87 and hydraulic fluid to be discharged from the retarding-use hydraulic chamber 88. If so, the shaft 84 is made to rotate relative to the cylindrical housing 83 in the arrow direction. As opposed to this, if the phase of the cam of the exhaust valve-use camshaft 69 is retarded, the hydraulic fluid feed/discharge control valve 90 causes hydraulic fluid to be fed to the retarding-use hydraulic chamber 88 and hydraulic fluid to be discharged from the advancing-use hydraulic chamber 87. If so, the shaft 84 is made to rotate relative to the cylindrical housing 83 in the opposite direction to the arrow. If the shaft 84 is made to rotate relative to the cylindrical housing 83, and if the action of feeding hydraulic fluid to the hydraulic chambers 87 and 88 and the action of discharging hydraulic fluid from the hydraulic chambers 87 and 88 are stopped, the relative rotation operation of the shaft 84 is made to stop and the shaft 84 is held at the relative rotation position at that time. Therefore, by the variable valve timing mechanism 81, it is possible to make the phase of the cam of the exhaust valve-use camshaft 69 advance by a desired amount and make the phase of the cam of the exhaust valve-use camshaft 69 retard by a desired amount.

Figure 7A:
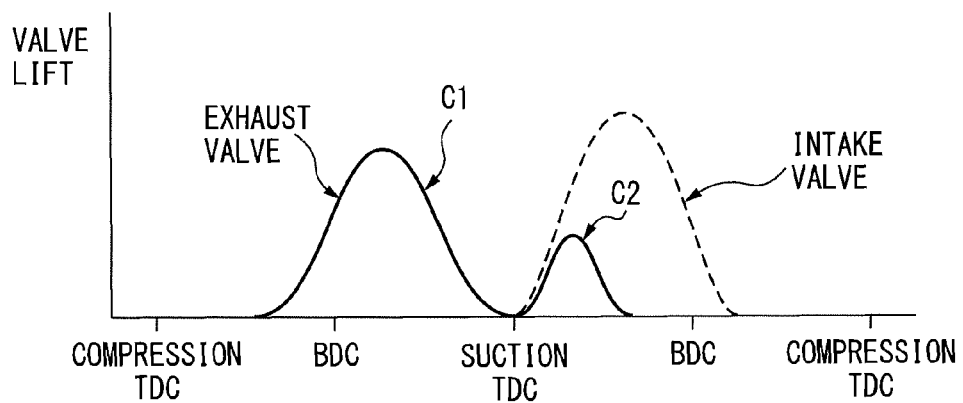
FIG. 7A and FIG. 7B are views showing changes in an exhaust valve lift and an intake valve lift.
Figure 7B:
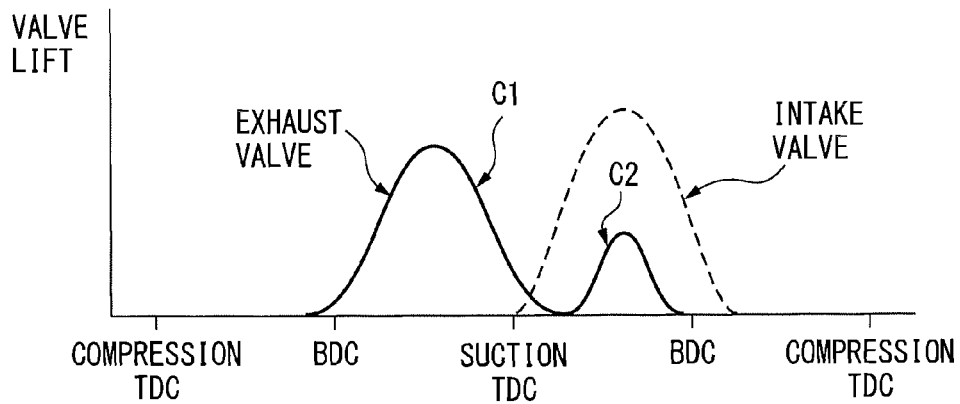

The solid lines of FIGS. 7A and 7B show the changes in the exhaust valve lift if the cam 69b having the two cams C1 and C2 shown in FIG. 5B is used for an opening action of the exhaust valve 56. As explained above, compared with the cam C1, the cam C2 is smaller. Therefore, as shown in FIGS. 7A and 7B, the amount of exhaust valve lift and the opening time of the exhaust valve 56 by the cam C2 become smaller than the amount of exhaust valve lift and the opening time of the exhaust valve 56 by the cam C1. The broken lines of FIGS. 7A and 7B show the changes of the intake valve lift. FIG. 7A shows when the phase of the cam of the exhaust valve-use camshaft 69 is advanced the most by the variable valve timing mechanism 81. At this time, the exhaust valve 56 continues open during the exhaust stroke, then is closed once near top dead center TDC of the suction stroke, then is immediately opened and continues opened over the first half of the suction stroke where the intake valve 53 opens. FIG. 7B shows when the phase of the cam of the exhaust valve-use camshaft 69 is retarded the most by the variable valve timing mechanism 81. At this time, the opening timings of the exhaust valve 56 due to the cam C1 and C2 are both retarded.

As shown in FIG. 7A, if the phase of the cam of the exhaust valve-use camshaft 69 is advanced the most, the opening action of the exhaust valve 56 by the cam C2 is performed if the amount of the intake valve lift is small, and a large amount of exhaust gas is pulled back from the exhaust port 57 to the combustion chamber 2. Therefore, the intake air temperature in the combustion chamber 2 increases and the amount of residual gas in the intake air in the combustion chamber 2 increases. As shown in FIG. 7B, if the phase of the cam of the exhaust valve-use camshaft 69 is retarded the most, the opening action of the exhaust valve 56 by the cam C2 is performed after a large amount of intake air flows into the combustion chamber 2. Therefore, the amount of exhaust gas which is pulled back from the exhaust port 57 to the combustion chamber 2 becomes smaller. Therefore, the action of increasing the intake air temperature in the combustion chamber 2 becomes weaker and the action of increasing the amount of residual gas in the combustion chamber 2 also becomes weaker. In this way, by using the variable valve timing mechanism 81 to change the phase of the cam of the exhaust valve-use camshaft 69, the action of increasing the intake air temperature in the combustion chamber 2 and the action of increasing the amount of residual gas in the combustion chamber 2 can be controlled. Note that, the variable valve timing mechanism 81 shown in FIG. 6 is one example. Various other types of variable valve timing mechanisms can also be used.

Figure 8:
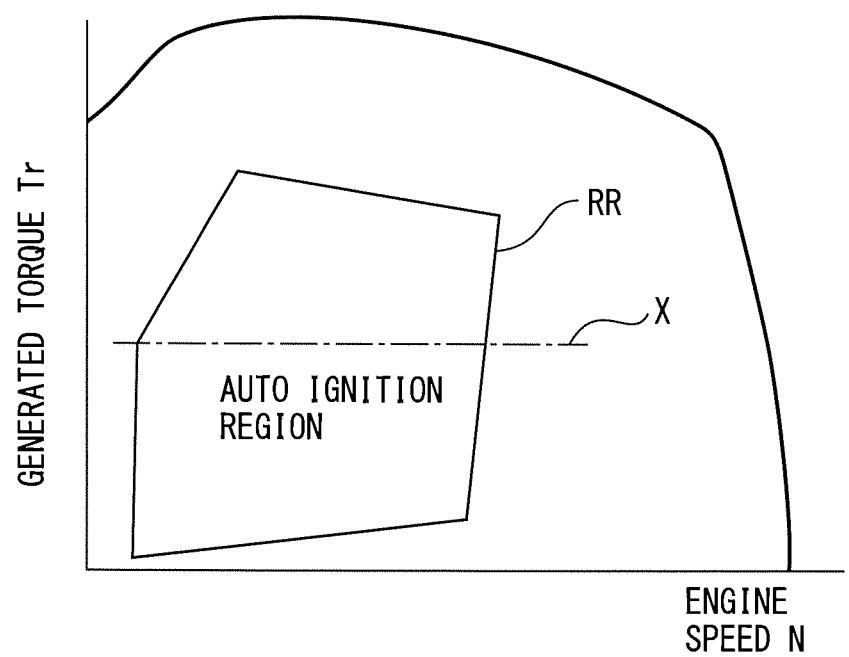
FIG. 8 is a view showing an autoignition region RR.

As explained above, in autoignition combustion, the fuel diffused in the combustion chamber 2 is made to burn in the combustion chamber 2 simultaneously at many points. If using this autoignition combustion to operate the engine, to obtain a sufficient engine output torque, it is necessary to cause autoignition after compression top dead center at an optimum autoignition timing where the generated torque of the engine would become the maximum. In this example, it is not possible to cause autoignition at an optimal autoignition timing where the generated torque of the engine would become the maximum after compression top dead center no matter what the engine operating state. The engine operating state where autoignition can be caused after compression top dead center at the optimal autoignition timing where the generated torque of the engine would become the maximum is limited. This engine operating state where autoignition can be caused after compression top dead center at the optimal autoignition timing where the generated torque of the engine would become the maximum is shown in FIG. 8 as the autoignition region surrounded by the solid line RR. Note that, at FIG. 8, the ordinate shows a generated torque Tr of the engine, while the abscissa shows an engine speed N.

That is, a reaction time is necessary until an air-fuel mixture autoignites in the combustion chamber 2. If the engine speed becomes higher, it is no longer possible to secure the reaction time required for the air-fuel mixture to autoignite. Therefore, in FIG. 8, if the engine speed becomes higher than the autoignition region RR, misfire occurs and autoignition operation can no longer be performed. However, if the engine load becomes higher and the generated torque of the engine exceeds the autoignition region RR, autoignition timing becomes excessively earlier, and thus knocking will be caused. As a result, good autoignition operation will no longer be possible. Therefore, as shown by the autoignition region RR of FIG. 8, autoignition combustion can be performed if the engine speed is relatively low and the generated torque of the engine is relatively low. In this embodiment of the present invention, in the engine operating region other than the autoignition region RR, the spark ignition combustion caused by using the spark plug 59 to ignite part of the air-fuel mixture and burn the remaining air-fuel mixture by the propagation of the ignited flame is performed.

In this regard, roughly speaking, unless the temperature of the air-fuel mixture in the combustion chamber 2 exceeds 900K, autoignition combustion will not occur. Therefore, in the autoignition region RR of FIG. 8, at a time of engine low load operation where the pressure and temperature of the air-fuel mixture at the start of compression are low, the cooling action of the intake air by the intercooler 12 is suppressed and the temperature of the air-fuel mixture is made to rise by making the exhaust valve 56 open two times as shown in FIGS. 7A and 7B so that the temperature of the air-fuel mixture in the combustion chamber 2 will exceed 900K. For example, at a time of engine low load operation in the autoignition region RR, the temperature of the air fed into the combustion chamber 2 is raised by stopping the circulation of cooling water to the intercooler 12, and the temperature of the air-fuel mixture is raised by making the exhaust valve 56 open two times as shown in FIG. 7A to pull back a large amount of exhaust gas into the combustion chamber 2. As opposed to this, in the region of a high engine load within the autoignition region RR of FIG. 8, the intake air pressure and intake air temperature become extremely high by the turbocharger 8. Accordingly, the rise of the temperature of the air-fuel mixture is suppressed by strengthening the cooling action of the intake air by the intercooler 12 and by making the exhaust valve 56 open one time during the exhaust stroke as shown in FIG. 5A. In this way, in the embodiment of the present invention, autoignition combustion is performed by controlling the intake air temperature and the amount of exhaust gas pulled back into the combustion chamber 2 according to the engine operating state.

Figure 9A:
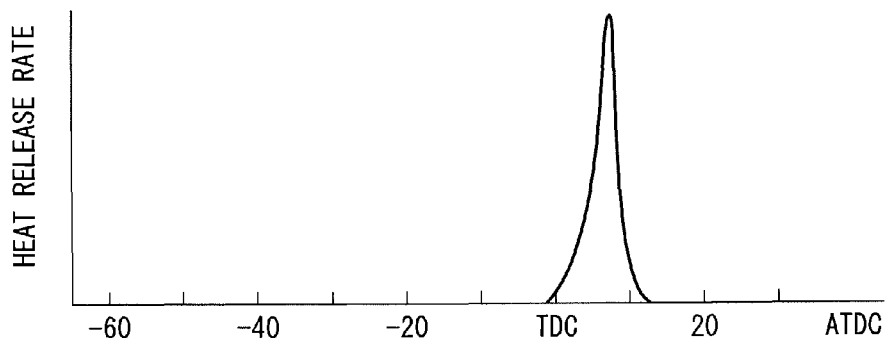
FIG. 9A and FIG. 9B are views for explaining a heat release rate and combustion noise if autoignition combustion is performed.

As explained above, in the autoignition region RR, autoignition can be made to occur at the optimal autoignition timing where the generated torque of the engine becomes the maximum. In this example, in the autoignition region RR, if the fuel injection amount to the combustion chamber 2 is small and the generated torque of the engine is low, the heat release rate is low and the heat release rate will not rapidly increase. Therefore the combustion pressure will not rapidly increase, so no large combustion noise will be caused. As opposed to this, in the autoignition region RR, if the fuel injection amount to the combustion chamber 2 becomes greater and the generated torque of the engine becomes higher, the heat release rate becomes higher. As shown in FIG. 9A, the heat release rate rapidly increases, so the combustion pressure rapidly increases and as a result a large combustion noise is generated.

Figure 9B:
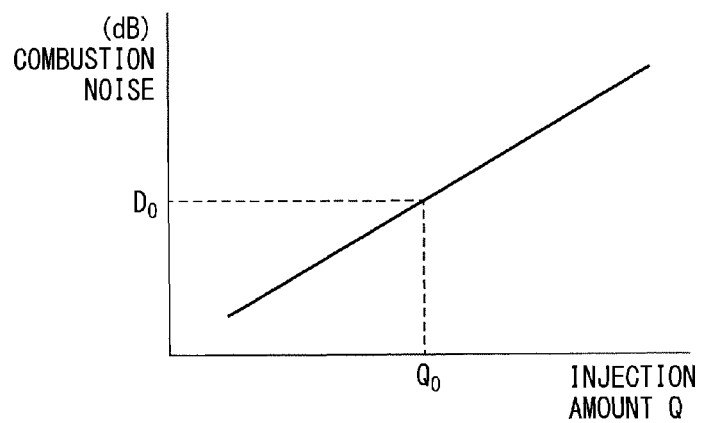

FIG. 9B shows the relationship between a fuel injection amount Q to the combustion chamber 2 and the combustion noise if autoignition combustion is performed in the autoignition region RR. As shown in FIG. 9B, if autoignition combustion is performed in the autoignition region RR, the combustion noise becomes greater as the fuel injection amount to the combustion chamber 2 becomes greater. However, in FIG. 9B, combustion noise $D_0$ shows the limit of the combustion noise which can be allowed. Therefore, it is necessary to prevent the combustion noise from exceeding this allowable limit combustion noise $D_0$. Further, the injection amount $Q_0$ in FIG. 9B shows the fuel injection amount Q to the combustion chamber 2 if the combustion noise becomes the allowable limit combustion noise $D_0$. Therefore, to prevent the combustion noise from exceeding this allowable limit combustion noise $D_0$, the fuel injection amount Q has to be kept from exceeding an injection amount $Q_0$. The dash and dot line X of FIG. 8 shows the boundary where the combustion noise becomes the allowable limit combustion noise $D_0$, and in the autoignition region RR where the generated torque of the engine is higher than this boundary X, a large combustion noise is generated.

Figure 10:
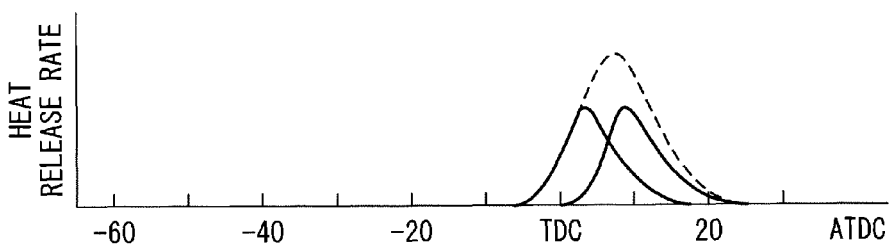
FIG. 10 is a view showing a heat release rate if generating two autoignition combustions with a time difference.

Therefore, in embodiments of the present invention, if the fuel injection amount Q exceeds the injection amount $Q_0$, the fuel injection is performed divided into several actions rather than changing the total amount of the fuel injection amount so that a plurality of autoignition combustions are caused with a time difference after the compression top dead center, as shown in FIG. 10. In this example shown in FIG. 10, the fuel injection is performed divided into two so that two autoignition combustions are caused with a time difference. The broken line of FIG. 10 shows the total of the heat release rates. Note that, FIG. 10 shows an example of injecting the same amount of fuel as the fuel injection amount in the example shown in FIG. 9A divided into two. If comparing FIG. 9A and the broken line of FIG. 10, in the example where the fuel injection is performed divided into two so that two autoignition combustions occur with a time difference as shown in FIG. 10, as compared with the example where the fuel injection is performed only once as shown in FIG. 9A, the peak of the heat release rate become smaller and the change of the heat release rate becomes gentler. As a result, rapid rise of the combustion pressure is suppressed, so combustion noise is suppressed.

Therefore, in the embodiment of the present invention, if the engine operating state is in the autoignition region RR where the generated torque of the engine is higher than the boundary X in FIG. 8, to suppress combustion noise, the fuel injection is performed divided into two so that two autoignition combustions occur with a time difference. In this example, performing fuel injection divided into two so that two autoignition combustions occur with a time difference is not that simple. Even if just dividing the fuel injection into two, it is not possible to provide a time difference between the two autoignition combustions. Usually, the two autoignition combustions end up occurring substantially simultaneously. Therefore, to explain these, first, the explanation will be started from the ignition delay time if autoignition combustion is performed.

As a formula for estimating the ignition delay time until the fuel autoignites, the Livengood-Wu integral is well known.

$$\left(\frac{1}{\tau}\right)_{P,T} = AP^n \exp\left(-\frac{E}{RT}\right) \tag{1}$$

$$\int_{t=0}^{t=te} \left(\frac{1}{\tau}\right)_{P,T} dt = 1 \tag{2}$$

$$\left(\frac{1}{\tau}\right)_{P,T} = A_1 \phi^\alpha P^\beta ON^\gamma \exp(\delta \cdot RES)\exp\left(-\frac{E}{RT}\right) \tag{3}$$

$$\sum \left(\frac{1}{\tau}\right) = \int \left(\frac{1}{\tau}\right)_{P,T} dt \tag{4}$$

The above (1) and (2) are called Livengood-Wu integral. The Livengood-Wu integral closely matches the experimental values. Note that, in the above formula (1), $\tau$ indicates an ignition delay time until autoignition, A a frequency factor, P a pressure ("n" is positive), E an activation energy, R a general gas constant, and T a temperature. The left side of the above formula (1) expresses the reciprocal of the ignition delay time ($1/\tau$) at the pressure P and the temperature T.

That is, if the temperature T becomes higher, the reaction speed (right side Arrhenius equation) becomes faster, but the ignition delay time $\tau$ becomes shorter, while if the pressure P becomes higher, the fuel density becomes higher, so the ignition delay time $\tau$ becomes shorter. Therefore, the relationship becomes like in the above formula (1). However, if the state where the ignition delay time is $\tau$ continues for a time dt, in this time dt, exactly $dt/\tau$ percent of the time $\tau$ elapses until autoignition. Therefore, if the state where the ignition delay time is $\tau 1$ continues for the time dt, the state where the ignition delay time is $\tau 2$ continues for the time dt, and then in the same way the state where the ignition delay time is $\tau n$ continues for the time dt, if the sum of $dt/\tau 1$, $dt/\tau 2$, ... $dt/\tau n$ ... becomes 100 percent, that is, becomes 1, autoignition occurs. Therefore, as shown in the above formula (2), if integrating by time the reciprocal ($1/\tau$) of the ignition delay time at the pressure P and the temperature T, a time $t_e$ if the integral becomes 1 becomes the ignition delay time $\tau$.

The above formula (3) shows a formula which is often used as a formula expressing the reciprocal ($1/\tau$) of the ignition delay time if considering other factors actually having an effect other than the pressure P and temperature T. Note that, in the above formula (3), $\phi$ indicates an equivalent ratio, ON an octane value, RES a residual gas ratio (%), and A', $\alpha$, $\beta$, $\gamma$, and $\delta$ identification constants (A', $\alpha$, $\beta$, $\delta$>0, $\gamma$<0). The other symbols are the same as in the above formula (1). Note that, in this embodiment of the present invention, the time integral value of the above formula (3) is shown by $\Sigma$ ($1/\tau$) as shown in the above formula (4). From the above formula (3), it will be understood that the higher the pressure P, the shorter the ignition delay time τ, the higher the temperature T, the shorter the ignition delay time τ, the larger the equivalent ratio φ, the shorter the ignition delay time τ, the higher the residual gas ratio RES, the shorter the ignition delay time τ, and the lower the octane value ON, the shorter the ignition delay time τ.

In embodiments of the present invention, to suppress combustion noise, the fuel injection is divided into two so that two autoignition combustions occur with a time difference. However, as explained above, even if simply dividing the fuel injection into two, it is not possible to provide a time difference between the two autoignition combustions. In this regard, the inventors engaged in studies on this and as a result discovered that if utilizing the inherent characteristic of the ignition delay time τ, it is possible to cause two autoignition combustions with a time difference.

That is, simply considered, the ignition delay time τ of the air-fuel mixture becomes shorter the higher the temperature of the air-fuel mixture. In this regard, in actuality, if the temperature of the air-fuel mixture exceeds a certain temperature, the ratio of shortening of the ignition delay time τ with respect to the amount of rise of the temperature of the air-fuel mixture starts to decrease. After that, there is a temperature region of the air-fuel mixture where conversely the ignition delay time τ becomes longer with respect to the amount of rise of the temperature of the air-fuel mixture. The inventors took note of this point and discovered that if utilizing the temperature region of the air-fuel mixture where the ignition delay time τ conversely becomes longer with respect to a rise in the temperature of the air-fuel mixture from after the ratio of shortening of the ignition delay time τ with respect to the amount of rise of the temperature of the air-fuel mixture starts to decrease, it is possible to cause two autoignition combustions with a time difference. The temperature region of the air-fuel mixture where the ignition delay time τ conversely becomes longer with respect to a rise in the temperature of the air-fuel mixture from after the ratio of shortening of the ignition delay time τ with respect to the amount of rise of the temperature of the air-fuel mixture starts to decrease will be called the "temperature region suppressing change of the ignition delay time" in the embodiment of the present invention.

Figure 11A:
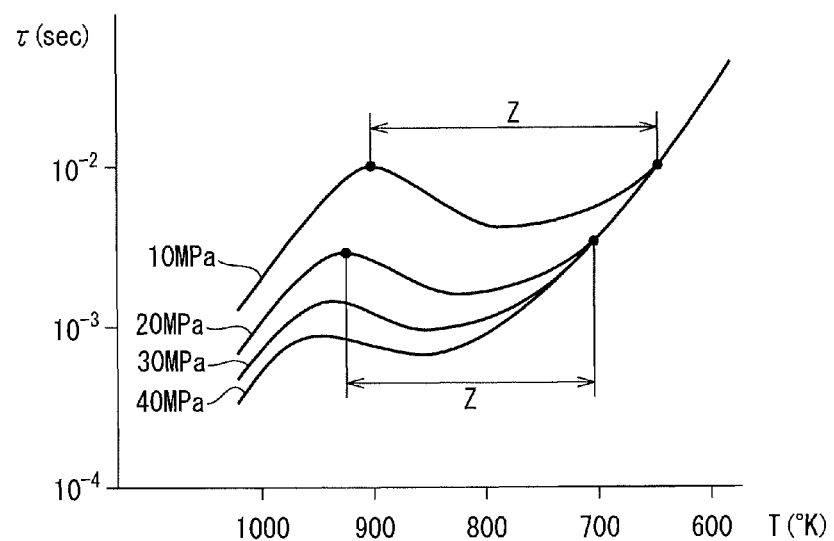
FIG. 11A and FIG. 11B are views for explaining an ignition delay time τ.
Figure 11B:
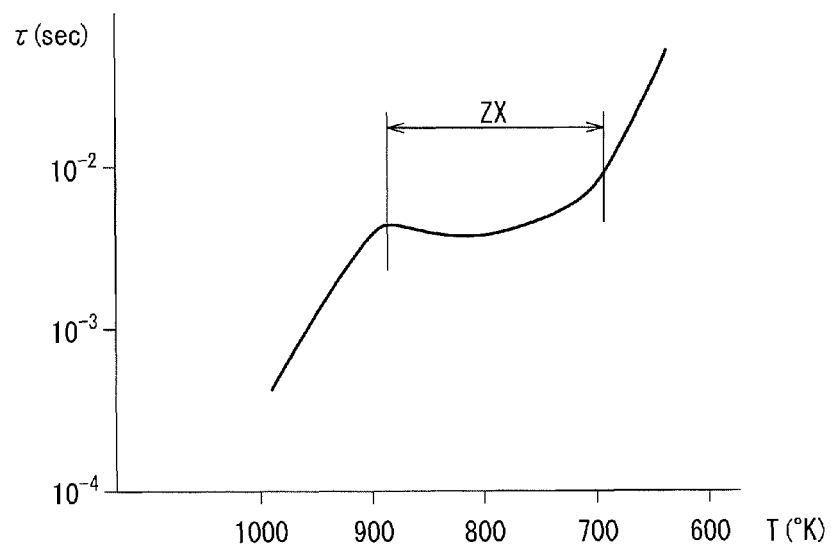

Next, this temperature region suppressing change of the ignition delay time will be explained with reference to FIG. 11A and FIG. 11B. FIG. 11A shows the ignition delay time T for different temperatures T (K) and pressures (10 MPa, 20 MPa, 30 MPa, and 40 MPa) if using a fuel comprised of n-heptane, using a rapid compression device to rapidly make the temperature T (K) and pressure in the compression chamber rapidly rise, then maintaining a certain temperature and certain pressure. From FIG. 11A, it will be understood that the higher the pressure in the compression chamber, the shorter the ignition delay time τ becomes. In FIG. 11A, for example, if taking note of the curve of the pressure 10 MPa, if the temperature T in the compression chamber is substantially 650K or less, the ignition delay time τ becomes shorter as the temperature T becomes higher. Even if the temperature T in the compression chamber is substantially 900K or more, the ignition delay time τ becomes shorter as the temperature T becomes higher.

However, in the region of the temperature T in the compression chamber from substantially 750K to substantially 900K, if the temperature T becomes higher, the ignition delay time τ becomes longer as the temperature T becomes higher. In this example, in the region of the temperature T in the compression chamber from substantially 750K to substantially 900K, an endothermic reaction occurs, and the higher the temperature T, the more active the endothermic reaction. Therefore, the ignition delay time τ becomes longer as the temperature T becomes higher. In this way, in the region of the temperature T in the compression chamber from substantially 750K to substantially 900K, the ignition delay time τ changes in a negative direction with respect to a rise of temperature T, so the region of the temperature T in the compression chamber from substantially 750K to substantially 900K is called the "negative temperature coefficient region". However, if the temperature T in the compression chamber becomes higher than substantially 650K, the ratio of shortening of the ignition delay time τ with respect to the amount of rise of temperature T starts to decrease. In the region of the temperature T in the compression chamber from substantially 650K to substantially 750K, the ratio of shortening of the ignition delay time τ gradually decreases along with the amount of rise of temperature T. If the temperature T in the compression chamber rises to substantially 750K, the ignition delay time τ no longer decreases.

Therefore, in FIG. 11A, if the pressure in the compression chamber is 10 MPa, the temperature region Z of the temperature T in the compression chamber from substantially 650K to substantially 900K, that is, the temperature region Z from when the ratio of shortening of the ignition delay time τ with respect to the amount of rise of the temperature T starts to decrease to when conversely the ignition delay time τ becomes longer with respect to a rise of the temperature T, becomes the temperature region for suppressing change of the ignition delay time. This temperature region Z for suppressing change of the ignition delay time changes depending on the pressure. If the pressure is 20 MPa, the temperature region Z for suppressing change of the ignition delay time becomes one of a temperature T in the compression chamber of from substantially 700K to substantially 930K.

In an internal combustion engine, the pressure and temperature in the combustion chamber rise along with a rise of the piston, so the change of the ignition delay time τ at the actual internal combustion engine differs somewhat from the curves of FIG. 11A showing the ignition delay time τ if the pressure is constant. FIG. 11B shows a typical change of the ignition delay time τ in an actual internal combustion engine. In the typical change of the ignition delay time τ shown in FIG. 11B, the ratio of shortening of the ignition delay time τ with respect to the amount of rise of the temperature T starts to decrease at substantially 700K, the ratio of shortening of the ignition delay time τ with respect to the amount of rise of the temperature T continues to decrease up to substantially 900K, and the ratio of shortening of the ignition delay time τ with respect to the amount of rise of the temperature T again increases if over substantially 900K. In FIG. 11B, the temperature region ZX suppressing change of the ignition delay time becomes between substantially 700K to substantially 900K.

The ignition delay time τ was studied for various internal combustion engines differing in compression ratio and for fuels differing in octane value, whereupon it has been proven that regardless of the compression ratio and octane value, the ratio of shortening of the ignition delay time τ with respect to the amount of rise of the temperature T starts to decrease at substantially 700K, the ratio of shortening of the ignition delay time τ with respect to the amount of rise of the temperature T continues to decrease up to substantially 900K, and the ratio of shortening of the ignition delay time τ with respect to the amount of rise of the temperature T again increases if over substantially 900K. That is, it has been proven that, regardless of the compression ratio and octane value, the region from substantially 700K to substantially 900K becomes the temperature region ZX suppressing change of the ignition delay time. Therefore, in embodiments of the present invention, the region from 700K to 900K will be referred to as the temperature region ZX suppressing change of the ignition delay time.

In embodiments of the present invention, this temperature region ZX suppressing change of the ignition delay time will be utilized to cause two autoignition combustions with a time difference. Next, this will be explained with reference to FIGS. 12A, 12B, and 12C. If referring to FIGS. 12A, 12B, and 12C, the ordinate $\Sigma$ ($1/\tau$) of FIGS. 12A, 12B, and 12C expresses the time integral values of the above-mentioned formula (3), as shown in the above-mentioned formula (4). In this example, the values of the identification constants A', $\alpha$, $\beta$, $\gamma$, and $\delta$ and activation energy E of the above-mentioned formula (3) used are the values found by experiments for the different temperature regions at FIG. 11B of the low temperature region of a temperature T of 700K or less, the temperature region ZX suppressing change of the ignition delay time from 700K to 900K, and the high temperature region of a temperature T of 900K or more. By using the values of the identification constants A', $\alpha$, $\beta$, $\gamma$, and $\delta$ and the activation energy E found by experiments for the different temperature regions in this way, it is possible to precisely estimate the ignition delay time $\tau$ at the different temperatures T.

Figure 12A:
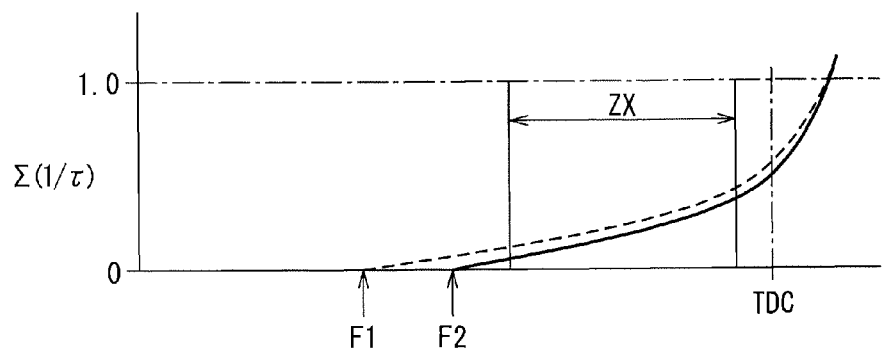
FIGS. 12A, 12B, and 12C are views showing changes in a time integral value Σ (1/τ) if fuel injection is performed.
Figure 12B:
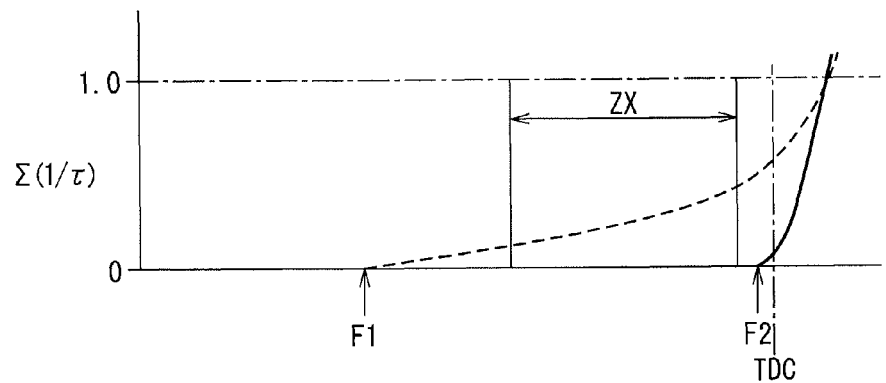
Figure 12C:
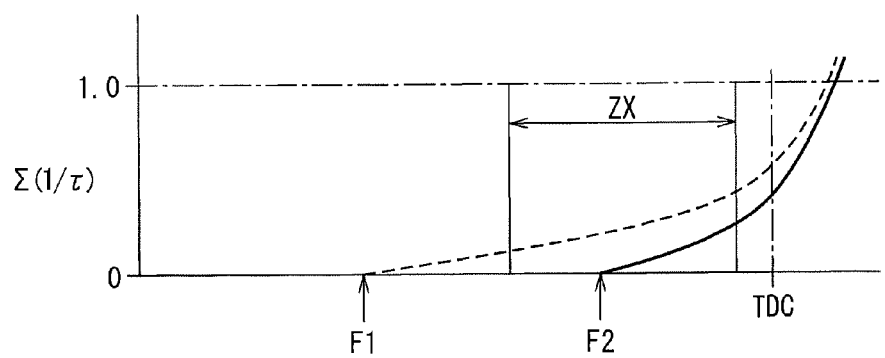

The abscissa of FIGS. 12A, 12B, and 12C shows the crank angle. At this abscissa, the first fuel injection F1 from the fuel injector 3, the second fuel injection F2 from the fuel injector 3, and compression top dead center TDC are shown. Further, in FIGS. 12A, 12B, and 12C, the temperature region ZX suppressing change of the ignition delay time is shown. Note that, in FIGS. 12A, 12B, and 12C, the broken lines show the changes in the time integral value $\Sigma$ ($1/\tau$) from after the first fuel injection F1 is performed, while the solid lines show the changes in the time integral value $\Sigma$ ($1/\tau$) from after the second fuel injection F2 is performed. As explained above, if the time integral value $\Sigma$ ($1/\tau$) becomes 1, it is estimated that autoignition combustion will occur. The above-mentioned formula (3) using the identification constants A', $\alpha$, $\beta$, $\gamma$, $\delta$ and the value of the activation energy E found by experiments for the different temperature regions precisely expresses the ignition delay time $\tau$, therefore, below, the difference in times autoignition combustion occurs will be explained based on the changes in the time integral value $\Sigma$ ($1/\tau$) calculated by this formula (3).

The first fuel injection F1 is usually performed at the optimum injection timing before the temperature T reaches the temperature region ZX suppressing change of the ignition delay time. FIGS. 12A, 12B, and 12C show examples where the first fuel injection F1 is performed at this optimum injection timing. Right after the first fuel injection F1 is performed, the concentration of the injected fuel is high, so the equivalent ratio $\phi$ is large, but the pressure P and temperature T in the combustion chamber are not that high. Therefore, as shown by the broken line of FIG. 12A, the time integral value $\Sigma$ ($1/\tau$) slowly increases. Next, if the compression stroke proceeds, the temperature T reaches inside the temperature region ZX suppressing change of the ignition delay time. If the temperature T reaches inside the temperature region ZX suppressing change of the ignition delay time, even if the temperature T rises if the temperature T is in the temperature region ZX suppressing change of the ignition delay time, the rise in temperature T will not cause the ignition delay time $\tau$ to change much at all. However, a rise in pressure P will cause the ignition delay time $\tau$ to change in a direction becoming shorter.

Right after the first fuel injection F1 is performed, the concentration of the injected fuel is high and thus the equivalent ratio $\phi$ is large, but the injected fuel gradually diffuses, so the equivalent ratio $\phi$ becomes smaller as time elapses. Therefore, if the temperature T becomes a temperature within the temperature region ZX suppressing change of the ignition delay time, the equivalent ratio $\phi$ becomes small. Therefore, the drop in the equivalent ratio $\phi$ causes the ignition delay time $\tau$ to change in a direction where it becomes longer. In this way, if the temperature T is in the temperature region ZX suppressing change of the ignition delay time, a rise of the pressure P causes the ignition delay time $\tau$ to change in a direction where it becomes shorter and a reduction of the equivalent ratio $\phi$ causes the ignition delay time $\tau$ to change in a direction where it becomes longer. Accordingly, as shown by the broken line in FIG. 12A, the time integral value $\Sigma$ ($1/\tau$) slowly increases. Next, if the compression stroke further proceeds and the temperature T becomes higher than a temperature in the temperature region ZX suppressing change of the ignition delay time, along with a rise of the temperature T and pressure P, as shown by the broken line of FIG. 12A, the time integral value $\Sigma$ ($1/\tau$) rapidly increases and autoignition occurs if the time integral value $\Sigma$ ($1/\tau$) becomes 1.

FIG. 12A shows an example of performing the second fuel injection F2 separated by an interval from the first fuel injection F1 before the temperature T reaches a temperature in the temperature region ZX suppressing change of the ignition delay time after the first fuel injection F1 is performed. In this example, as shown by the solid line of FIG. 12A, the time integral value $\Sigma$ ($1/\tau$) rises separated by a slight interval from the time integral value $\Sigma$ ($1/\tau$) for the first fuel injection F1 shown by the broken line of FIG. 12A and becomes 1 substantially simultaneously with the time integral value $\Sigma$ ($1/\tau$) for the first fuel injection F1. Therefore, in this example, it is not possible to cause two autoignition combustions with a sufficient time difference. Note that, differences in the residual gas ratio RES and octane value ON do not affect the difference between time integral value $\Sigma$ ($1/\tau$) in the first fuel injection F2 and the time integral value $\Sigma$ ($1/\tau$) in the second fuel injection F1. Therefore, differences in the residual gas ratio RES and octane value ON are not considered here.

FIG. 12B shows an example of performing the second fuel injection F2 if the temperature T exceeds a temperature within the temperature region ZX suppressing change of the ignition delay time so as to broaden the interval between the first fuel injection F1 and the second fuel injection F2. In this example, if the pressure P and temperature T are high, second fuel injection F2 is performed. Therefore, if second fuel injection F2 is performed, the pressure P and temperature T are high and further the equivalent ratio $\phi$ is extremely large, so as shown by the solid line in FIG. 12B, the time integral value $\Sigma$ ($1/\tau$) rapidly increases and the time integral value $\Sigma$ ($1/\tau$) becomes 1 substantially the same time as the time integral value $\Sigma$ ($1/\tau$) for the first fuel injection F1. Therefore, in this example as well, it is not possible to cause two autoignition combustions with a sufficient time difference.

However, as shown by the solid line of FIG. 12C, if second fuel injection F2 is performed if the temperature T is in the temperature region ZX suppressing change of the ignition delay time, in the same way as shown in FIG. 12A, the time integral value $\Sigma$ ($1/\tau$) for the second fuel injection F2 slowly rises separated by an interval from the time integral value $\Sigma (1/\tau)$ for the first fuel injection F1 shown by the broken line of FIG. 12C. However, if taking note of the difference in time integral values between the time integral value $\Sigma (1/\tau)$ for the first fuel injection F1 shown by the broken line and the time integral value $\Sigma (1/\tau)$ for the second fuel injection F2 shown by the solid line, in the example shown in FIG. 12C, unlike the example shown in FIG. 12A, the difference in time integral values for the fuel injections F1 and F2 if the temperature T exceeds a temperature in the temperature region ZX suppressing change of the ignition delay time becomes larger. As a result, after that, even if the time integral value $\Sigma (1/\tau)$ rapidly increases, a clear difference arises in the time integral value $\Sigma (1/\tau)$ between the crank angle where the time integral value $\Sigma (1/\tau)$ for the first fuel injection F1 becomes 1 and the crank angle where the time integral value $\Sigma (1/\tau)$ for the second fuel injection F2 becomes 1. Therefore, in this example, two autoignition combustions occur with a sufficient time difference.

As explained above, if the temperature T is in the temperature region ZX suppressing change of the ignition delay time, the ignition delay time $\tau$ does not change much at all. That is, if the temperature T is in the temperature region ZX suppressing change of the ignition delay time, the progression of the chemical reaction of the fuel stalls. Therefore, if the temperature T is in the temperature region ZX suppressing change of the ignition delay time, the injected fuel diffuses in a state where the progression of the chemical reaction of the fuel stalls. If the injected fuel diffuses in the state where progression of the chemical reaction of the fuel stalls in this way, the injected fuel sufficiently diffuses if progression of the chemical reaction of the fuel is started. This is extremely important.

Figure 13:
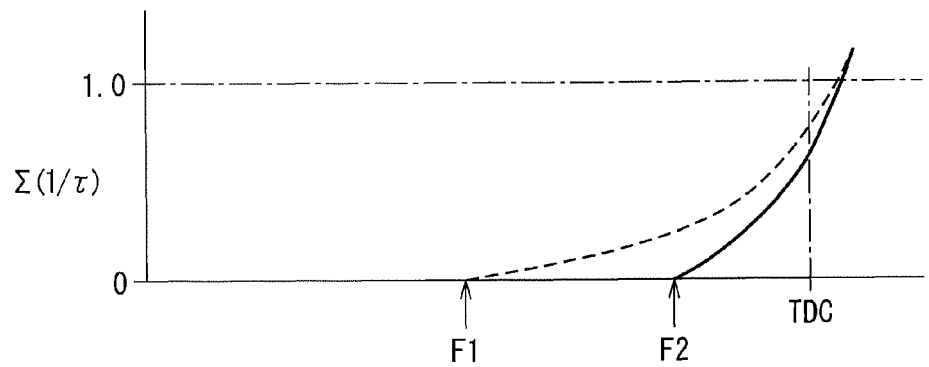
FIG. 13 is a view showing a change in a time integral value Σ (1/τ) if fuel injection is performed.

That is, if assuming there were no temperature region ZX suppressing change of the ignition delay time, even if the injected fuel diffused at this time, the rise in the pressure P would cause the time integral value $\Sigma (1/\tau)$ to increase and the rise in temperature T would cause the time integral value $\Sigma (1/\tau)$ to increase, so as shown in FIG. 13, the time integral value $\Sigma (1/\tau)$ for the first fuel injection F1 shown by the broken line and the time integral value $\Sigma (1/\tau)$ for the second fuel injection F2 shown by the solid line would continue to increase. In this example, at the same crank angle, the equivalent ratio φ for the second fuel injection F2 is larger than the equivalent ratio φ for the first fuel injection F1, so compared with the time integral value $\Sigma (1/\tau)$ for the first fuel injection F1 shown by the broken line, the time integral value $\Sigma (1/\tau)$ for the second fuel injection F2 shown by the solid line rapidly rises. As a result, the difference of the time integral value between the time integral value $\Sigma (1/\tau)$ for the first fuel injection F1 and the time integral value $\Sigma (1/\tau)$ for the second fuel injection F2 would gradually become smaller. If the difference in time integral values for the fuel injections F1 and F2 gradually becomes smaller in this way, it is not possible to cause two autoignition combustions with a sufficient time difference.

As opposed to this, if the temperature T is within the temperature region ZX suppressing change of the ignition delay time, that is, if the progression of the chemical reaction of the fuel stalls, if causing the injected fuel to diffuse, the rise in pressure P causes the time integral value $\Sigma (1/\tau)$ to increase, but the rise in temperature T does not cause the time integral value $\Sigma (1/\tau)$ to increase, so as shown in FIG. 12C, the time integral value $\Sigma (1/\tau)$ for the second fuel injection F2 slowly rises separated by an interval from the time integral value $\Sigma (1/\tau)$ for the first fuel injection F1. As a result, as shown in FIG. 12C, it is possible to make the difference of the time integral values for the fuel injections F1 and F2 at a time when the temperature T exceeds a temperature within the temperature region ZX suppressing change of the ignition delay time larger. In other words, if the temperature T is within the temperature region ZX suppressing change of the ignition delay time, that is, if the progression of the chemical reaction of the fuel stalls, if causing the injected fuel to diffuse, it is possible to make the injected fuel diffuse while suppressing the increase of the time integral value $\Sigma (1/\tau)$ for the second fuel injection F2. As a result, it becomes possible to cause two autoignition combustions with a sufficient time difference.

Note that, in this example, if making the fuel injection amount of the second fuel injection F2 smaller than the fuel injection amount of the first fuel injection F1, the equivalent ratio φ of the fuel spray by the second fuel injection F2 is made smaller than the equivalent ratio φ of the fuel spray by the first fuel injection F1. If the equivalent ratio φ of the fuel spray by the second fuel injection F2 becomes smaller, the ignition delay time $\tau$ for the second fuel injection F2 becomes longer and it becomes possible to further suppress an increase of the time integral value $\Sigma (1/\tau)$ for the second fuel injection F2 if the temperature T is within the temperature region ZX suppressing change of the ignition delay time. As a result, it is possible to further increase the time difference of the two autoignition combustions. Therefore, the fuel injection amount of the second fuel injection F2 is preferably made smaller than the fuel injection amount of the first fuel injection F1. Therefore, in this embodiment of the present invention, the fuel injection amount of the second fuel injection F2 is made smaller than the fuel injection amount of the first fuel injection F1.

As will be understood from the above explanation, by performing the first fuel injection F1 before the temperature T reaches the temperature region ZX suppressing change of the ignition delay time and performing the second fuel injection F2 if the temperature T is within the temperature region ZX suppressing change of the ignition delay time, it becomes possible to cause two autoignition combustions with a sufficient time difference. In this example, the injection timing of the second fuel injection F2 is set at a timing at which the temperature T is within the temperature region ZX suppressing change of the ignition delay time, that is, the temperature T is from 700K to 900K, and at which crank angle difference becomes greatest between the crank angle if the heat release rate of the autoignition combustion by the first fuel injection F1 peaks and the crank angle if the heat release rate of the autoignition combustion by the second fuel injection F2 peaks. Note that, hereinafter, the fuel injection performed before the temperature T reaches a temperature in the temperature region ZX suppressing change of the ignition delay time will be referred to as the "primary fuel injection G1", while the fuel injection performed if the temperature T is within the temperature region ZX suppressing change of the ignition delay time will be referred to as the "secondary fuel injection G2".

Figure 14:
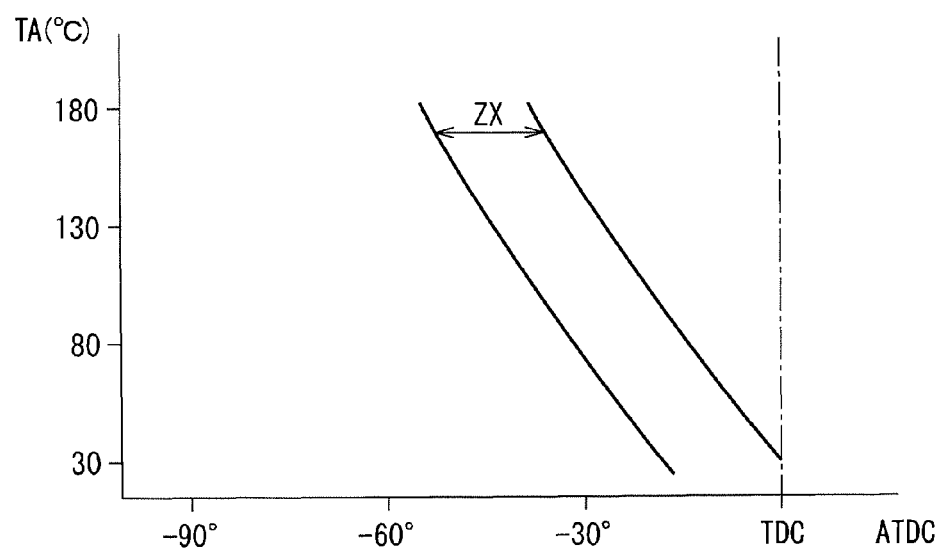
FIG. 14 is a view showing a relationship of a temperature region ZX suppressing change of an ignition delay time and an intake temperature inside a combustion chamber at a time of the start of compression.

In this regard, the crank angle if the temperature T becomes within the temperature region ZX suppressing change of the ignition delay time, that is, the crank angle if the temperature T becomes between a temperature T of 700K to 900K, changes depending on the intake temperature in the combustion chamber 2 at the start of compression, and the crank angle if the temperature T becomes within the temperature region ZX suppressing change of the ignition delay time becomes more to the advanced side the higher the intake temperature in the combustion chamber 2 at the start of compression. FIG. 14 shows the relationship between the crank angle (shown by after compression top dead center ATDC) if the temperature T becomes within the temperature region ZX suppressing change of the ignition delay time and the intake temperature TA in the combustion chamber 2 at the start of compression. Note that, FIG. 14 shows the relationship between the crank angle and the intake temperature TA if the actual compression ratio is held at a certain actual compression ratio. As shown in FIG. 14, the crank angle if the temperature T becomes within the temperature region ZX suppressing change of the ignition delay time becomes more to the advanced side the higher the intake temperature in the combustion chamber 2 at the start of compression, and accordingly, in the embodiment of the present invention, the injection timing of the secondary fuel injection G2 is made more to the advanced side the higher the intake temperature TA in the combustion chamber 2 at the start of compression.

Figure 15A:
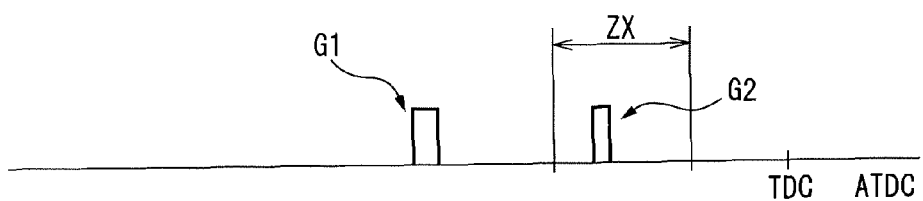
FIGS. 15A, 15B, 15C, and 15D are views for explaining a method of fuel injection used in an embodiment according to the present invention.

Next, referring to FIGS. 15A, 15B, 15C, and 15D, a method of fuel injection used in embodiments of the present invention will be explained. Note that, at FIGS. 15A, 15B, 15C, and 15D, the abscissa shows the crank angle, TDC shows compression top dead center, and ZX shows the temperature region suppressing change of the ignition delay time. Note that, the example shown in FIG. 12C is also shown in FIG. 15A. First, referring to FIG. 15A, in the embodiment shown in FIG. 15A, the primary fuel injection G1 is performed before the temperature T reaches a temperature within the temperature region ZX suppressing change of the ignition delay time, while the secondary fuel injection G2 is performed if the temperature T is within the temperature region ZX suppressing change of the ignition delay time. As shown in FIG. 15A, in this embodiment, the primary fuel injection G1 is comprised of a single fuel injection, while the secondary fuel injection G2 is also comprised of a single fuel injection.

Figure 15B:
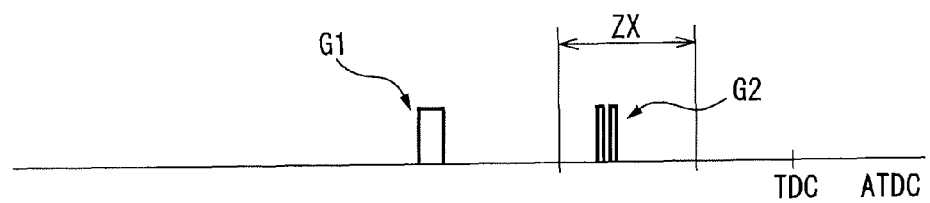
Figure 15C:
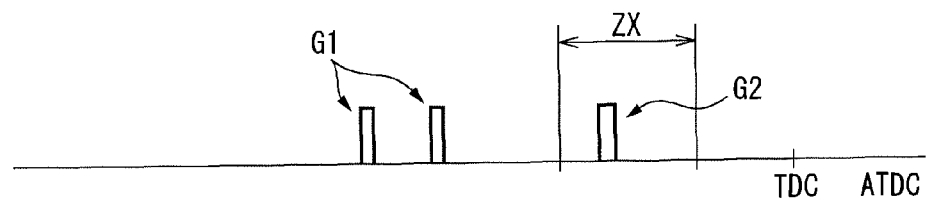

FIGS. 15B and 15C show modifications of the fuel injection shown in FIG. 15A. In the embodiment shown in FIG. 15B, in the same way as the embodiment shown in FIG. 15A, the primary fuel injection G1 is comprised of a single fuel injection. However, in the embodiment shown in FIG. 15B, the secondary fuel injection G2 is comprised of two fuel injections. In this way, if the secondary fuel injection G2 is performed divided into two, the fuel injection amount per time becomes smaller. Therefore, the equivalent ratio $\phi$ of the fuel spray can be made smaller. As a result, it is possible to suppress an increase of the time integral value $\Sigma$ (1/$\tau$) for the secondary fuel injection G2 and therefore it is possible to further increase the time difference of the two autoignition combustions.

In the embodiment shown in FIG. 15C, the primary fuel injection G1 is comprised of two fuel injections. In this way, in this embodiment of the present invention, it is possible to make the primary fuel injection G1 one comprised of a plurality of fuel injections. In the same way, it is possible to make the secondary fuel injection G2 one comprised of a plurality of fuel injections. Note that, the primary fuel injection G1 may also be performed during the suction stroke.

Figure 15D:
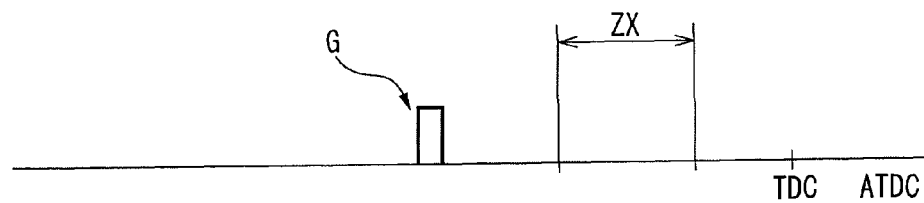

FIG. 15D shows an example where the fuel injection G is performed only before the temperature T becomes a temperature within the temperature region ZX suppressing change of the ignition delay time. That is, FIG. 15D shows the primary fuel injection G performed if the engine operating state is in the autoignition region RR shown in FIG. 8 and the generated torque of the engine is lower than the boundary X. As will be understood if comparing the primary fuel injection G1 shown in FIGS. 15A, 15B, and 15C and the primary fuel injection G shown in FIG. 15D, both the primary fuel injection G1 shown in FIGS. 15A, 15B, and 15C and the primary fuel injection G shown in FIG. 15D are performed at substantially the same timing. Note that, even if the engine operating state is within the autoignition region RR shown in FIG. 8 and the generated torque of the engine is lower than the boundary X, the fuel injection can be performed divided into the primary fuel injection G1 and the secondary fuel injection G2.

Figure 16A:
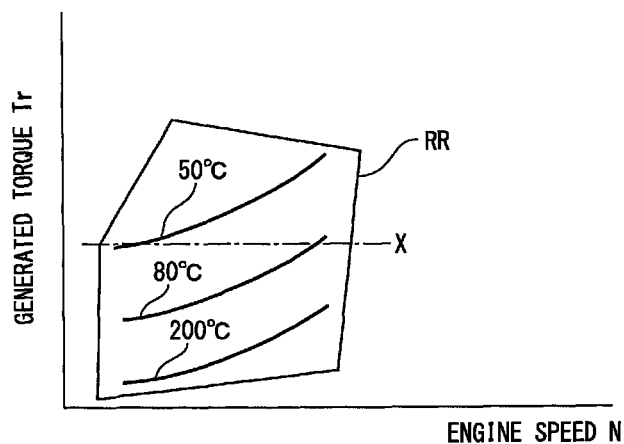
FIGS. 16A, 16B, and 16C are views for explaining an example of intake temperature inside a combustion chamber at a time of the start of compression.

As explained above, roughly speaking, if the temperature of the air-fuel mixture in the combustion chamber 2 does not exceed 900K, autoignition combustion does not occur. Therefore, in the autoignition region RR of FIG. 8, at a time of engine low load operation where the pressure and temperature of the air-fuel mixture at a time of start of compression are low, the intake temperature in the combustion chamber 2 at the start of compression has to be raised so that the temperature of the air-fuel mixture in the combustion chamber 2 exceeds 900K. FIG. 16A shows an example of the intake temperature in the combustion chamber 2 at the start of compression required for causing autoignition combustion in the autoignition region RR. As shown in FIG. 16A, the intake temperature in the combustion chamber 2 at the start of compression is made higher the lower the generated torque Tr of the engine is and is made higher as the engine speed N becomes higher.

Figure 16B:
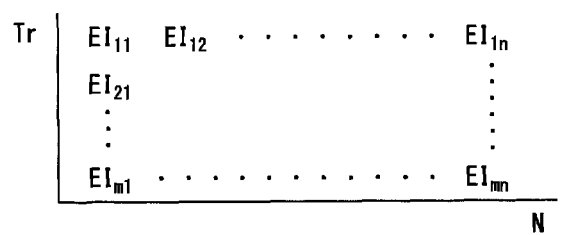
Figure 16C:
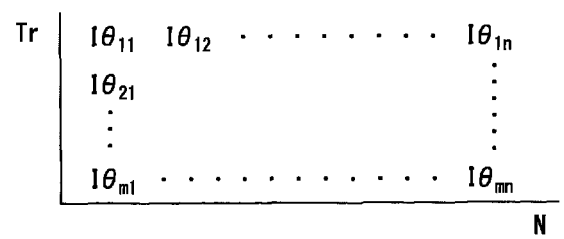

In this example, as explained above, the intake temperature in the combustion chamber 2 at the start of compression can be controlled by changing the amount of circulation of cooling water to the intercooler 12 by the cooling water pump 14. Furthermore, the intake temperature in the combustion chamber 2 at the start of compression can be controlled by making the exhaust valve 56 open twice as shown in FIG. 7A and making the opening timing of the exhaust valve 56 change by the feed and discharge control of hydraulic fluid by the hydraulic fluid feed/discharge control valve 90 of the variable valve timing mechanism 81. In the embodiment of the present invention, the drive power EI of the cooling water pump 14 required for obtaining the optimum intake temperature in the combustion chamber 2 at the start of compression is stored as a function of the generated torque Tr and engine speed N of the engine in the form of a map such as shown in FIG. 16B in advance in the ROM 32, while the drive power I$\theta$ of the hydraulic fluid feed/discharge control valve 90 required for obtaining the optimum intake temperature in the combustion chamber 2 at the start of compression is stored as a function of the generated torque Tr and engine speed N of the engine in the form of a map such as shown in FIG. 16C in advance in the ROM 32.

Figure 17A:
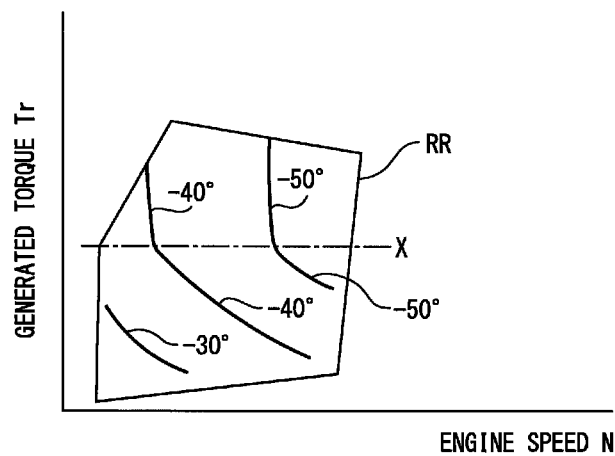
FIG. 17A and FIG. 17B are views showing a typical example of injection timing of primary fuel injection G and a map of injection timing W of primary fuel injection G, respectively.
Figure 17B:
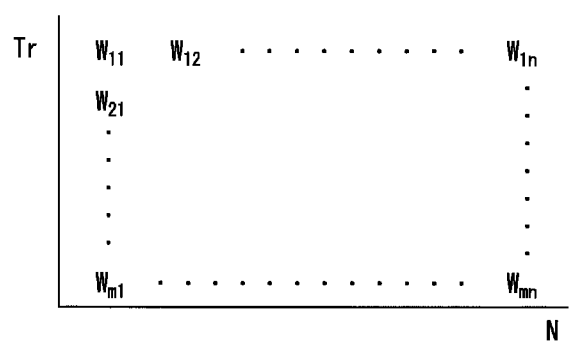

FIG. 17A shows a typical example of the injection timing of the primary fuel injection G1 shown in FIGS. 15A, 15B, 15C, and 15D. Note that, in FIG. 17A, the solid line shown in the autoignition region RR shows the equivalent injection timing (shown by crank angle of after compression top dead center ATDC). That is, the more the injection amount of the primary fuel injection G1 increases, the longer the injection period of the primary fuel injection G1, so the more the injection amount of the primary fuel injection G1 increases, the more the injection timing of the primary fuel injection G1 is advanced. However, the autoignition reaction takes time, and thus the higher the engine speed N, the more the injection timing of the primary fuel injection G1 is advanced. Therefore, as shown in FIG. 17A, in the autoignition region RR where the generated torque Tr is lower than the boundary X, the more the injection amount of the primary fuel injection G1 increases, that is, the higher the generated torque Tr of the engine, the more the injection timing of the primary fuel injection G1 is advanced, while the higher the engine speed N becomes, the more the injection timing of the primary fuel injection G1 is advanced. In the embodiment of the present invention, the injection timing W of the primary fuel injection G1 in the autoignition region RR where the generated torque Tr is lower than the boundary X is stored as a function of the generated torque Tr and engine speed N of the engine in the form of a map such as shown in FIG. 17B in advance in the ROM 32.

In the embodiment of the present invention, in the autoignition region RR where the generated torque Tr is higher than the boundary X, if the demanded injection amount increases, the injection amount of the secondary fuel injection G2 is increased in the state where the injection amount of the primary fuel injection G1 is held at a constant amount. In this way, in the autoignition region RR where the generated torque Tr is higher than the boundary X, even if the demanded injection amount increases, the injection amount of the primary fuel injection G1 is held at a constant amount, and the injection timing of the primary fuel injection G1, as shown in FIG. 17A, is not advanced even if the generated torque Tr of the engine becomes higher. The injection timing of the primary fuel injection G1 is advanced the higher the engine speed N.

In this regard, even if the primary fuel injection G1 is performed before the temperature T reaches a temperature within the temperature region ZX suppressing change of the ignition delay time and the secondary fuel injection G2 is performed if the temperature T is within the temperature region ZX suppressing change of the ignition delay time, if the injection timing of the primary fuel injection G1 and the injection timing of the secondary fuel injection G2 become close, it no longer becomes possible to cause two autoignition combustions with a time difference. Therefore, in embodiments of the present invention, primary fuel injection G1 from the fuel injector 3 is performed at a timing at which the injected fuel of the secondary fuel injection G2 autoignites after the injected fuel of the primary fuel injection G1 autoignites. As shown in FIG. 16A, in the autoignition region RR where the generated torque Tr is higher than the boundary X, the intake temperature in the combustion chamber 2 at the start of compression is at most about 80° C. If the intake temperature in the combustion chamber 2 at the start of compression is at most about 80° C., as will be understood from FIG. 14, the range of crank angle if the temperature T is within the temperature region ZX suppressing change of the ignition delay time is from −30°ATDC to −15°ATDC or so at the most advanced.

As shown in FIG. 17A, in the autoignition region RR where the generated torque Tr is higher than the boundary X, the injection timing of the primary fuel injection G1 is −35° ATDC or so at the most advanced. Therefore, for example, if the injection timing of the secondary fuel injection G2 is set to −20° ATDC or so, if advancing the injection timing of the primary fuel injection G1 from the injection timing of the secondary fuel injection G2 by a 15° crank angle or so, it is possible to cause two autoignition combustions with a time difference. Note that, it has been proven that if actually making the injection timing of the primary fuel injection G1 earlier than the injection timing of the secondary fuel injection G2 by a 5° crank angle or more, it is possible to cause two autoignition combustions with a time difference. Therefore, in embodiments of the present invention, the injection timing of the primary fuel injection G1 is set to a timing earlier than the injection timing of the secondary fuel injection G2 by a 5° crank angle or more so that the injected fuel of the secondary fuel injection G2 autoignites after the injected fuel of the primary fuel injection G1 autoignites.

In this example, in the embodiment of the present invention, the injection timing W1 of the primary fuel injection G1 and the injection timing W2 of the secondary fuel injection G2 in the autoignition region RR where the generated torque Tr is higher than the boundary X are set at timings giving the greatest crank angle difference between the crank angle where the heat generation rate of the autoignition combustion by the primary fuel injection G1 peaks and the crank angle where the heat generation rate of the autoignition combustion by the secondary fuel injection G2 peaks. Note that, in this example, as will be understood from FIG. 14, the optimum injection timing W2 of the secondary fuel injection G2 changes according to the intake temperature TA in the combustion chamber 2 at the start of compression, so the injection timing of the secondary fuel injection G2 is set according to the intake temperature TA in the combustion chamber 2 at the start of compression. In the embodiment of the present invention, the optimum injection timing W1 of the primary fuel injection G1 is stored as a function of the generated torque Tr and engine speed N of the engine in the form of a map such as shown in FIG. 18A in advance in the ROM 32, while the optimum injection timing W2 of the secondary fuel injection G2 is stored as a function of the generated torque Tr and engine speed N of the engine in the form of a map such as shown in FIG. 18B in advance in the ROM 32. Note that, as explained above, the primary fuel injection G1 may also be performed during the suction stroke.

In this way, in embodiments of the present invention, there is provided an internal combustion engine comprising the fuel injector 3 arranged in the combustion chamber 2 and injecting fuel comprised of gasoline and the electronic control unit 30 controlling a fuel injection action from the fuel injector 3, primary fuel injection G1 and secondary fuel injection G2 from the fuel injector 3 being successively performed to cause autoignition of an injected fuel of the primary fuel injection G1 and autoignition of an injected fuel of the secondary fuel injection G2, and the temperature region ZX suppressing change of an ignition delay time where a change of ignition delay time τ with respect to a rise in temperature in the combustion chamber 2 is suppressed appearing in the compression stroke at a temperature in the combustion chamber 2 of 700K to 900K, wherein the electronic control unit 30 is configured to make the fuel injector 3 perform the secondary fuel injection G2 if a temperature in the combustion chamber 2 is a temperature within the temperature region ZX suppressing change of the ignition delay time during the compression stroke, and the electronic control unit 30 is configured to make the fuel injector 3 perform the primary fuel injection G1 during the compression stroke or suction stroke before the temperature in the combustion chamber 2 reaches a temperature in the temperature region ZX suppressing change of the ignition delay time at a fuel injection timing at which the injected fuel of the secondary fuel injection G2 is autoignited after the injected fuel of the primary fuel injection G1 is autoignited.

In this embodiment of the present invention, in the engine operating region, the autoignition combustion region RR where autoignition combustion is performed is set in advance. The primary fuel injection G1 and the secondary fuel injection G2 are successively performed if the generated torque Tr of the engine exceeds the predetermined boundary X in the autoignition combustion region RR, and only the primary injection G1 is performed if the generated torque Tr of the engine is lower than the predetermined boundary X in the autoignition combustion region RR.

Figure 19:
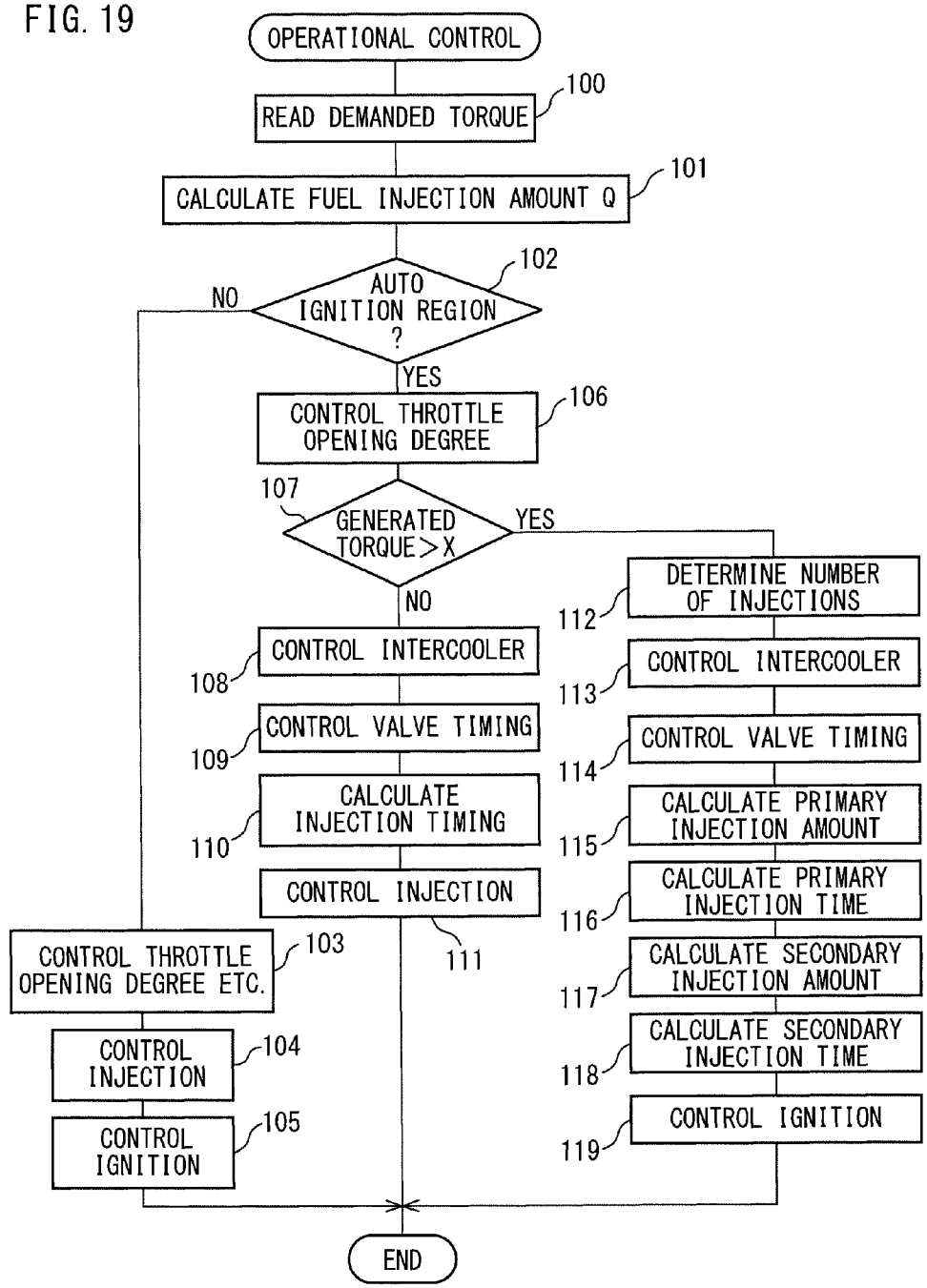
FIG. 19 is a flow chart for operational control of an engine.

FIG. 19 shows engine operating control. This control is performed by interruption every fixed time. Referring to FIG. 19, first, at step 100, the demanded torque of the engine calculated based on the output signal of the load sensor 41 is read. Next, at step 101, the fuel injection amount Q from the fuel injector 3 is calculated based on the demanded torque. The fuel injection amount Q is increased as the demanded torque becomes higher. Next, at step 102, it is judged if the engine operating state is in the autoignition region RR shown in FIG. 8 and FIG. 17A. If it is judged that the engine operating state is not in the autoignition region RR shown in FIG. 8 and FIG. 17A, the routine proceeds to step 103 where the spark ignition combustion in which the air-fuel mixture is ignited by the spark plug 59 is performed.

That is, at step 103, the opening degree of the throttle valve 11, the amount of circulation of cooling water to the intercooler 12 by the cooling water pump 14, and the opening timing of the exhaust valve 56 by the variable valve timing mechanism 81 are controlled to values suitable for the spark ignition combustion by the spark plug 59. Next, at step 104, the control of injection from the fuel injector 3 is performed by the amount Q of fuel injection calculated at step 101. Next, at step 105, an ignition control of the air-fuel mixture by the spark plug 59 is performed.

If it is judged at step 102 that the engine operating state is in the autoignition region RR shown in FIG. 8 and FIG. 17A, the routine proceeds to step 106 where autoignition combustion is performed. That is, at step 106, the opening degree of the throttle valve 11 is controlled so that the air-fuel ratio becomes a predetermined lean air-fuel ratio corresponding to the operating state of the engine. Next, at step 107, it is judged that the generated torque Tr of the engine is higher than the boundary X shown in FIG. 8 and FIG. 17A. If it is judged that the generated torque Tr of the engine is lower than the boundary X shown in FIG. 8 and FIG. 17A, the routine proceeds to step 108 where only the primary fuel injection G1 is performed.

That is, at step 108, the cooling water pump 14 is driven by the drive power EI calculated from the map shown in FIG. 16B and then, at step 109, the hydraulic fluid feed/discharge control valve 90 is driven by the drive power $I\theta$ calculated from the map shown in FIG. 16C so that the intake temperature in the combustion chamber 2 at the start of compression becomes the intake temperature shown in FIG. 16A. Next, at step 110, the injection timing W of the primary fuel injection G1 is calculated from the map shown in FIG. 17B. Next, at step 111, control of injection of primary fuel injection G1 from the fuel injector 3 is performed by the fuel injection amount Q calculated at step 101 and the injection timing W calculated at step 110.

If, at step 107, it is judged that the generated torque Tr of the engine is higher than the boundary X shown in FIG. 8 and FIG. 17A, the routine proceeds to step 112 where the primary fuel injection G1 and secondary fuel injection G2 are performed. That is, at step 112, the number of times of injection of the primary fuel injection G1 and the number of times of injection of the secondary fuel injection G2 are determined. As explained above, the number of times of injection of the primary fuel injection G1 and the number of times of injection of the secondary fuel injection G2 can be set to any values. Here, as shown in FIG. 15A, an example where the number of times of injection of the primary fuel injection G1 and the number of times of injection of the secondary fuel injection G2 are both single times will be explained. If the number of times of injection of the primary fuel injection G1 and the number of times of injection of the secondary fuel injection G2 are determined at step 112, the routine proceeds to step 113 where the cooling water pump 14 is driven by the drive power EI calculated from the map shown in FIG. 16B and then, at step 114, the hydraulic fluid feed/discharge control valve 90 is driven by the drive power $I\theta$ calculated from the map shown in FIG. 16C so that the intake temperature in the combustion chamber 2 at the start of compression becomes the intake temperature shown in FIG. 16A.

Next, at step 115, the injection amount Q1 of the primary fuel injection G1 is calculated. In the example shown in FIG. 19, the injection amount Q1 of the primary fuel injection G1 is made the injection amount $Q_0$ shown in FIG. 9B. Next, at step 116, the injection timing W1 of the primary fuel injection G1 is calculated from the map shown in FIG. 18A. Next, at step 117, the injection amount Q1 of the primary fuel injection G1 is subtracted from the fuel injection amount Q calculated at step 101 to thereby calculate the injection amount Q2 (=Q−Q1) of the secondary fuel injection G2. Next, at step 118, the injection timing W2 of the secondary fuel injection G2 is calculated from the map shown in FIG. 18B. Next, at step 119, control of injection of primary fuel injection G1 from the fuel injector 3 is performed by the fuel injection amount Q1 calculated at step 115 and the injection timing W1 calculated at step 116 and control of injection of secondary fuel injection G2 from the fuel injector 3 is performed by the fuel injection amount Q2 calculated at step 117 and the injection timing W2 calculated at step 118.

Figure 20:
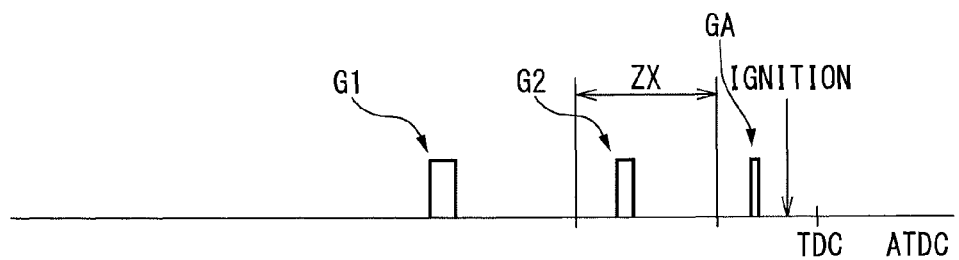
FIGS. 20A, 20B, 20C, and 20D are views for explaining a method of fuel injection used in another embodiment according to the present invention.

Next, while referring to FIG. 20A, another embodiment designed to use the spark plug 59 to assist autoignition will be explained. Note that, in FIG. 20A, the abscissa indicates the crank angle, TDC indicates compression top dead center, and ZX indicates the temperature region suppressing change of the ignition delay time. Further, FIG. 20A shows an example where primary fuel injection G1 and secondary fuel injection G2 are performed in the same way as the example shown in FIG. 15A. As shown in FIG. 20A, in this embodiment, until the temperature T exceeds the temperature region ZX suppressing change of the ignition delay time and the crank angle reaches compression top dead center TDC, the assist fuel injection GA from the fuel injector 3 and the ignition action by the spark plug 59 are performed, and the assist fuel ignited by the spark plug 59 serves as a flame to make the injected fuel of the primary fuel injection G1 burn by autoignition combustion.

If using the assist fuel ignited by the spark plug 59 as a flame for causing the injected fuel of the primary fuel injection G1 to burn by autoignition combustion in this way, not only is there the advantage that it is possible to cause autoignition combustion of the injected fuel of the primary fuel injection G1 at the optimum timing, but there is also the advantage that the combustion of the assist fuel causes the temperature in the combustion chamber 2 to rise, so even if the intake temperature in the combustion chamber 2 at the start of compression is low, the autoignition combustion can be caused.

Note that, in this embodiment, the optimum injection amount QA of the assist fuel injection GA is stored as a function of the generated torque Tr and the engine speed N of the engine in the form of a map such as shown in FIG. 20B in advance in the ROM 32. The optimum injection timing WA of the assist fuel injection GA is stored as a function of the generated torque Tr and engine speed N of the engine in the form of a map such as shown in FIG. 20C in advance inside the ROM 32. The optimum ignition timing IG of the spark plug 59 is stored as a function of the generated torque Tr and engine speed N of the engine in the form of a map such as shown in FIG. 20D in advance in the ROM 32.

Figure 21:
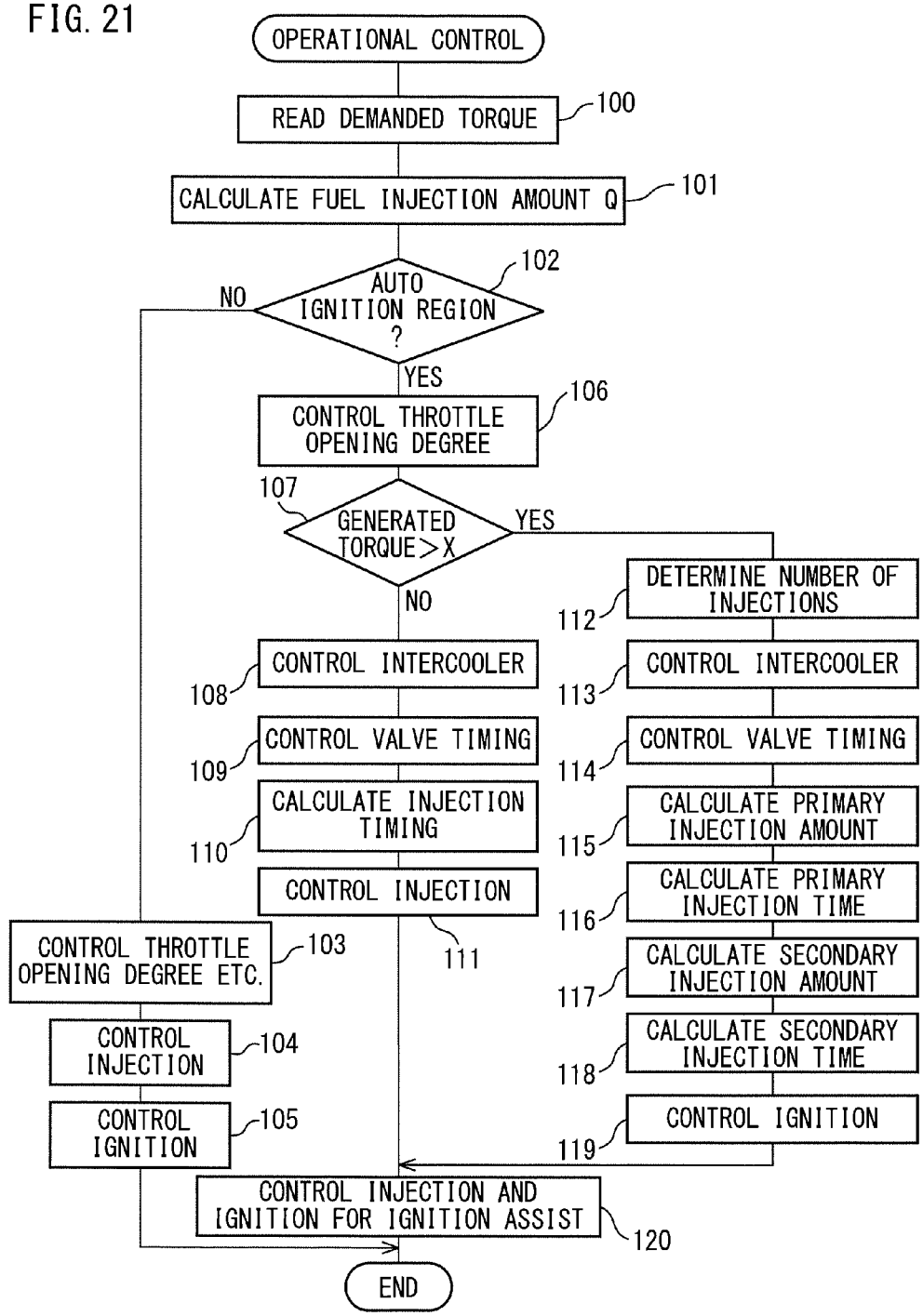
FIG. 21 is a flow chart of another embodiment for operational control of an engine.

FIG. 21 shows the control routine for operation of the engine for executing another embodiment shown in FIG. 20A. This routine is also performed by interruption every fixed time. Referring to FIG. 21, step 100 to step 119 in FIG. 21 are the same as step 100 to step 119 in FIG. 19. The only place different from FIG. 19 in FIG. 21 is the addition of step 120. Therefore, the explanation of step 100 to step 119 at FIG. 21 will be omitted and only the part related to step 120 at FIG. 21 will be explained.

If referring to FIG. 21, if, at step 111, the injection control of the primary fuel injection G1 is completed and if, at step 119, the injection control of the primary fuel injection G1 and the injection control of the secondary fuel injection G2 are completed, the routine proceeds to step 120 where the injection control and ignition control of assist fuel are performed. That is, at step 120, the assist fuel is injected from the fuel injector 3 in the optimum injection amount QA calculated from the map shown in FIG. 20B and at the optimum injection timing WA calculated from the map shown in FIG. 20C, while an ignition action by the spark plug 59 is performed at the optimum ignition timing IG calculated from the map shown in FIG. 20D.

What is claimed is:

1. An internal combustion engine comprising: a fuel injector arranged in a combustion chamber and to inject fuel comprised of gasoline and an electronic control unit to control a fuel injection action from the fuel injector, primary fuel injection and secondary fuel injection from the fuel injector being successively performed to cause autoignition of an injected fuel of the primary fuel injection and autoignition of an injected fuel of the secondary fuel injection, and a temperature region suppressing change of an ignition delay time where a change of ignition delay time with respect to a rise in temperature in a combustion chamber is suppressed appearing in a compression stroke at a temperature in the combustion chamber of 700K to 900K,
wherein said electronic control unit is configured to make the fuel injector perform the secondary fuel injection if a temperature in the combustion chamber is a temperature within the temperature region suppressing change of the ignition delay time during the compression stroke, and said electronic control unit is configured to make the fuel injector perform the primary fuel injection during the compression stroke or suction stroke before the temperature in the combustion chamber reaches a temperature in the temperature region suppressing change of the ignition delay time at a fuel injection timing at which the injected fuel of the secondary fuel injection is autoignited after the injected fuel of the primary fuel injection is autoignited.

2. The internal combustion engine as claimed in claim 1, wherein in the engine operating region, an autoignition combustion region where autoignition combustion is performed is set in advance, the primary fuel injection and the secondary fuel injection are successively performed if a generated torque of the engine exceeds a predetermined boundary in said autoignition combustion region, and only the primary injection is performed if the generated torque of the engine is lower than the predetermined boundary in said autoignition combustion region.

3. The internal combustion engine as claimed in claim 1, wherein the fuel injection amount of the secondary fuel injection is made smaller than the injection amount of the primary fuel injection.

4. The internal combustion engine as claimed in claim 1, wherein the higher an intake temperature in the combustion chamber at the start of compression, the more the injection timing of the secondary fuel injection is advanced.

5. The internal combustion engine as claimed in claim 1, wherein, in the engine operating region, an autoignition combustion region where autoignition combustion is performed is set in advance, and, if a generated torque of the engine is lower than a predetermined boundary in said autoignition combustion region, the higher the generated torque of the engine, the more the injection timing of the primary fuel injection is advanced.

6. The internal combustion engine as claimed in claim 1, wherein, the engine comprises a valve drive mechanism enabling a double opening operation causing an exhaust valve to open in an exhaust stroke and a suction stroke, and said valve drive mechanism causes the exhaust valve to open during the suction stroke and thereby raise an intake temperature in the combustion chamber at the start of compression.

7. The internal combustion engine as claimed in claim 1, wherein, the engine comprises a spark plug arranged in the combustion chamber, and the fuel injected from the fuel injector is ignited by the spark plug to use the ignited fuel as a flame for causing the injected fuel of the primary fuel injection to autoignite.

* * * * *